United States Patent
Pankow et al.

(10) Patent No.: US 8,311,853 B1
(45) Date of Patent: **\*Nov. 13, 2012**

(54) METHOD AND SYSTEM FOR ENROLLING IN A MEDICATION COMPLIANCE PACKAGING PROGRAM

(75) Inventors: Greg Pankow, Morton Grove, IL (US); Syed Y. Ali, Chicago, IL (US); Christina P. Marotta, Chicago, IL (US); Dana J. Dymek, Vernon Hills, IL (US); Rishi Khullar, Deerfield, IL (US)

(73) Assignee: Walgreen Co., Deerfield, IL (US)

( * ) Notice: Subject to any disclaimer, the term of this patent is extended or adjusted under 35 U.S.C. 154(b) by 241 days.

This patent is subject to a terminal disclaimer.

(21) Appl. No.: 12/275,891

(22) Filed: Nov. 21, 2008

(51) Int. Cl.
*G06Q 10/00* (2006.01)

(52) U.S. Cl. .................................. 705/3; 705/2

(58) Field of Classification Search .................. 705/2, 3
See application file for complete search history.

(56) References Cited

U.S. PATENT DOCUMENTS

| | | | | |
|---|---|---|---|---|
| 7,856,363 | B2 * | 12/2010 | Palazzolo et al. | 705/2 |
| 2007/0265882 | A1 * | 11/2007 | Jennings et al. | 705/3 |
| 2008/0308445 | A1 | 12/2008 | Dolak | |
| 2009/0030719 | A1 | 1/2009 | Nadas et al. | |
| 2009/0030720 | A1 | 1/2009 | Nadas et al. | |
| 2009/0030725 | A1 * | 1/2009 | Nadas et al. | 705/3 |
| 2009/0043608 | A1 | 2/2009 | Nadas et al. | |
| 2009/0043610 | A1 | 2/2009 | Nadas et al. | |
| 2009/0043611 | A1 | 2/2009 | Nadas et al. | |

OTHER PUBLICATIONS

U.S. Appl. No. 11/781,938, filed Jul. 23, 2007, on behalf of Nadas et al., entitled "Method and System for Delivering to a Customer a Plurality of Prescriptions Having Aligned Refill Dates".
U.S. Appl. No. 11/926,817, filed Oct. 29, 2007, on behalf of Lewis, entitled "Method of Increasing Compliance of a Medication Within a Multi-Dose Blister Pack".
U.S. Appl. No. 12/276,053, filed Nov. 21, 2008, on behalf of Ali et al., entitled "Method and System for Calculating an Alignment Date for Prescriptions".
U.S. Appl. No. 12/276,073, filed Nov. 21, 2008, on behalf of Ali et al., entitled "Method and System for Aligning Prescriptions to a User-Selected Date".
U.S. Appl. No. 60/963,871, filed Aug. 31, 2006, on behalf of Nadas et al., entitled "Comprehensive Medication Management System".

\* cited by examiner

*Primary Examiner* — Robert Morgan
*Assistant Examiner* — Maroun Kanaan
(74) *Attorney, Agent, or Firm* — Francis C. Kowalik; Marshall, Gerstein & Borun LLP; Randall G. Rueth

(57) ABSTRACT

A method and system facilitate enrollment of a customer in a medication compliance packaging program. The medication compliance packaging program facilitates proper dosing of each included medication dispensing each medication in a customized package and thereby serving as a personalized, prepackaged pill organizer. The compliance package groups all of the customer's daily pills, separated by the day and time of day that the customer takes each dose. The disclosed method and system provide a convenient means for a customer to enroll in the program, select prescription medications to include in the medication compliance packaging, and set up a dose schedule for each medication.

25 Claims, 24 Drawing Sheets

*FIG. 4*

Walgreens READY DOSE Medication System — 314

Patient Name: PHIL SCRIPT — 336

Home | Need Help? | Logout — 338, 318, 340

📞 1 800 123-4567 — 342

320

Validate Your Account

▼ Identity validation — 324

Enter a Walgreens prescription number that you have filled within the last 6 months.
If you don't have a prescription number, please call 1-800-123-4567 to validate your account.

Note: Enter the entire 12-digit number. See the examples to the right.

For mail service labels, please enter the Rx number then the store number (labeled ST)>

Prescription Number: [_____] — 322

Note: For verification purpose only

We protect your privacy. Read the Walgreens Online Privacy and Security Policy

[Cancel] — 334    [Continue] — 332

▶ Web Registration

JANE Q PUBLIC
IBUPROFEN 800MG TABLETES
TAKE ONE TABLET BY MOUTH TWICE DAILY
3389950 32019
Walgreens
(847)-765-4321

Walgreens — 326
Rx: 1234567 — 328
Phil Script — 330
ATENOLOL 100MG TABS
ST 12345

Walgreens
ReadyDose
Medication System

Patient Name: PHIL SCRIPT

| 1. Choose Prescriptions | 2. Set Schedule | 3. Shipping | 4. Billing | 5. Review Order | 6. Order Confirmation |

| Home | Need Help? | Logout |
☎ 1 800 123-4567

⚠ You will run out of pills for MEDICATION A 10MG TABLETS, MEDICATION B 10MG TABLETS before we can mail you more. We recommend that you pick up these prescriptions at your Walgreens Pharmacy.

Step 3: Delivery Question

Please choose an option.

Option 1: Pick Up at Store
I'll pick up these prescriptions at my Walgreens Pharmacy.
Note: You will pick up at the pharmacy only once. After this time, the prescriptions will be shipped in your ReadyDose.

[ Pick Up at Store ]

Option 2: Ship to Home
I'll wait for you to ship these prescriptions to me. I know that I'll run out of pills before you can mail me more.

[ Ship to Home ]

Frequently Asked Questions?
Should I pick up or have it mailed?
How will this order be packaged?
When will this medication go in ReadyDose?

[ Previous ]

Walgreens READY DOSE

Welcome May | Elpyoo | Logout

Search

| Patient Last Name: | [____] 638A | First Name: | [____] 638B |
| Phone Number: | [__]-[__]-[__] 638C | Date of Birth: | [__]/[__]/[__] 638D |
| Order Number: | [____] 638E | Shipping Date: | [07]/[06]/[2008] 638F |

[Search] 640  [Clear Fields] 642

| Patient Name | Phone Number | Date of Birth | Address | Order Number | Ship By | Action |
|---|---|---|---|---|---|---|
| SMITH, JOHN | 847-555-9568 | 01/01/1960 | 200 Main Street | 10000005433 | 07/08/2008 | [Sign Up] 662 |
| PATIENT, BEA | 847-555-6313 | 10/10/1970 | 104 Main Street | 10000005441 | 07/08/2008 | [Account Details] 664 |
| BROWN, ROBERT | 555-867-5309 | 09/09/1930 | 4920 Mill Road | 10000005641 | 07/08/2008 | [Setup Alignment] 666 |

METHOD AND SYSTEM FOR ENROLLING IN A MEDICATION COMPLIANCE PACKAGING PROGRAM

FIELD OF THE INVENTION

The present disclosure generally relates to a method for enrolling customers in a medication compliance program and, more particularly, to enrolling customers in a medication compliance program that uses customized packaging to facilitate compliance with a prescribed medication regimen.

BACKGROUND

Compliance with medication regimens is often a problem for patients taking multiple medications. Many patients have difficulty remembering when to take each medication, and remembering whether they have taken a particular dose. Patients on multiple-medication regimens also face other difficulties related to these regimens. For example, the prescriptions generally are filled at different times and, therefore, have refill dates at different times. This may be an inconvenience for a patient, for example, where the store location is not convenient, where the patient depends on others to pick up the prescription, or where a patient's schedule does not coincide with the pharmacy schedule. Many customers may have difficulty remembering multiple dates on which they must order or pick up prescription refills. Additionally, taking medication when away from home—whether for a few hours or a few days—can be difficult when it requires carrying an assortment of vials or other containers containing the various medications in the regimen or combining all of the medications into one container. All of these problems may lead to missed or incorrect doses of one or more medications in the regimen, which may adversely affect the health of the patient.

SUMMARY OF THE DISCLOSURE

A disclosed method, system, and user-interface provide means to facilitate enrollment of a customer in, and execution of, a medication compliance packaging program.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. The method may also include receiving a shipping address and receiving payment information. Receiving the shipping address may include receiving a saved shipping address, receiving a current shipping address, or receiving a new shipping address. Likewise, receiving payment information may include receiving payment information previously associated with the customer record or receiving new payment information.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. The method may also include providing an option to transfer a prescription previously filled at a different pharmacy and receiving information related to the prescription previously filled at the different pharmacy.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. The method also includes determining whether each prescription is eligible for the medication compliance packaging program and providing a list of eligible prescriptions from which to select the plurality of prescriptions.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. According to the embodiment, the method includes automatically setting the one or more dose times for each medication automatically where the prescription indicates dose times, and receiving a selection of the one or more dose times for each prescription that does not specifically indicate dose times. The method may also include selecting each of the one or more dose times from at least four dose time options. Optionally, the method may include assigning to each of the at least four dose time options a descriptive label. The method may also optionally allow a user to edit the descriptive labels.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. The method also includes determining, for each selected prescription, whether to set up a partial order. The method may determine whether to set up a partial order by determining when the customer will exhaust a current supply of the prescribed medication. The method may also include calculating an estimate of when the customer will exhaust the current supply based on the last time the prescription was filled, or based on an indication from the customer of how much of the current supply of the prescribed medication remains. The method may further include adjusting the program start date in response to the indication from the customer of how much of the current supply of the prescribed medication remains.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. The method also includes determining, for each selected prescription, whether to set up a partial order. The method may determine whether to set up a partial order by determining when the customer will exhaust a current supply of the prescribed medication. The method may also include setting up one or more partial orders and determining a delivery date for each partial order. Additionally, in some embodiments, the method includes determining for each partial order whether the customer will exhaust the current supply of the medication before the delivery date for the partial order, and receiving for each partial order for which the customer will exhaust the current supply before the delivery date, an indication either that the customer prefers to pick up the partial order at a store or that the customer prefers the partial order to be provided by shipping service or postal service. Where the customer prefers to pick up the partial order, the method may include providing an opportunity to change the pickup time for the partial order, providing an opportunity to change the pickup date for the partial order, and providing an opportunity to change the location at which the partial order will be picked up.

In one embodiment, a method commences by retrieving a customer record. After retrieving the customer record, the method includes receiving a selection of a plurality of prescriptions associated with the customer record, where each prescription is for a medication. According to the method, one or more dose times is set for each of the selected prescriptions and a program start date is calculated. The method also includes providing to the customer, on or before the program start date, a medication compliance package containing at least two medications having aligned refill dates. The program start date is calculated based on at least a first delivery method by which the compliance package is provided to the customer. The method also includes calculating, based on either an indication from the customer of how much of a current supply of the medication remains or a calculated estimate of how much of the current supply of the medication remains, the date on which the customer will exhaust the current supply of the medication. The method then includes determining whether the customer will exhaust the current supply of the medication before the program start date. If the customer will exhaust the current supply of the medication before the program start date, the method includes evaluating an alternate delivery method by which the compliance package could be provided to the customer, and evaluating a recalculated program start date based on at least the alternate delivery method by which the compliance package could be provided to the customer.

A disclosed enrollment system includes one or more computing devices, digital storage means associated with at least one of the one or more computing devices, and a digital network. The system also includes a set of machine-readable instructions stored on one or more memory devices and operable to cause the computing devices to complete a series of tasks including: retrieving a customer record; displaying a user-interface screen; receiving a selection of a plurality of prescriptions associated with the customer record, where each prescription is for a medication; setting one or more dose times for each selected prescription; aligning refill dates associated with the two or more selected prescriptions; and calculating a program start date. Optionally, the system may automatically set the one or more dose times for each prescription that specifically indicates dose times, and receive a selection of the one or more dose times for each prescription that does not specifically indicate dose times. The instructions may also optionally cause the system to generate a label for use in packaging the medications associated with the selected prescriptions or to print information associated with the selected prescriptions. Moreover, the instructions may optionally cause the system to provide the option to transfer a prescription previously filled at a different pharmacy and to receive information related to the prescription previously filled at the different pharmacy. Still further, the instructions may optionally cause the system to determine, for each selected prescription, whether to set up a partial order, wherein determining whether to set up a partial order is accomplished by determining when the customer will exhaust a current supply of the medication.

A disclosed user-interface employed in a system for enrolling a customer in a medication compliance packaging program includes one or more user-interface screens. The user-interface includes an indication of a plurality of prescriptions associated with the customer, where each prescription is for a medication. The user-interface also includes means for selecting at least one of the one or more prescriptions. The user-interface also provides an indication of one or more dose times for each of the prescribed medications associated with the selected prescriptions, an indication of a shipping address, and an indication of a payment method. In some embodiments, the user interface includes means for changing at least one of the one or more dose times. In some embodiments, the user-interface includes means for changing the shipping address. In some embodiments, the user-interface includes means for changing the payment method. Moreover, in some embodiments, the user-interface includes one or more multimedia tutorials, where each tutorial is an audio file, a video file, or a flash animation.

In one embodiment, a system for compliance medication packaging includes one or more computing devices, digital storage means associated with at least one of the one or more computing devices, and a digital network. The system also includes machine-readable instructions stored on one or more memory devices and operable to retrieve a customer record from the digital storage means, displaying various of the information included in the customer record on a user-interface. The instructions also cause the system to display a user-interface screen, and receive a selection of a plurality of prescriptions associated with the customer record, each prescription for a medication. The instructions further cause the system to set one or more dose times for each selected prescription, and align refill dates associated with two or more selected prescriptions. Further, the instructions cause the system to calculate a program start date and determine, for each selected prescription, whether to set up a partial order. The system may also include a package-creating device that creates a customized package for the medications associated with the prescriptions. The package-creating device may print any or all of medication information, customer information, pharmacy information on an information card, and may further print dates and time-of-day indicators on each of a plurality daily medication tabs. The package-creating device may also print information on the back of each of the plurality of daily medication tabs. Further, the system may also include a packaging device for filling a plurality of medication blisters associated with the plurality of daily medication tabs. The machine-readable instructions may also include instructions that cause the packaging device and the package-creating device to use the information included in the customer record or received by the user-interface screen to fill the plurality of blisters and to create the customized package for the medications.

In one embodiment, a method for implementing a compliance medication packaging program commences by retrieving a customer record. The system implementing the method receives a selection of a plurality of prescriptions associated with the customer record, each prescription for a medication. Next the system sets, for each prescription, one or more dose times, calculates a program start date, and determines, for each selected prescription, whether to set up a partial order. The method may also include receiving a shipping address for the customer and receiving payment information for the customer. In some embodiments, the method includes providing the option to transfer a prescription previously filled at a different pharmacy, and receiving information related to the prescription previously filled at the different pharmacy. The method may further include determining, for each prescription associated with the customer record, whether the prescription is eligible for the medication compliance packaging program, and providing a list of eligible prescriptions from which to select the plurality of prescriptions. In some embodiments, the method includes automatically setting the one or more dose times for each prescription that specifically indicates dose times, and receiving a selection of the one or more dose times for each prescription that does not specifically indicate dose times. The dose times may each be assigned a descriptive label, and the descriptive labels may be changed. Additionally, the method may include determining whether to set up a partial order by determining whether the customer will exhaust a current supply of the medication before the program start date. The method may include making the determination as to whether the customer will exhaust the current supply of the medication based on the last time the prescription was filled, or based on an indication from the customer of how much of the current supply of the medication remains. The method may include adjusting the program start date in response to the indication from the customer of how much of the current supply of the medication remains. After receiving the selection of the plurality of the prescriptions, setting the one or more dose times for each, and calculating a program start date, the method may also include printing one or more customized blister cards, and may further include filling a plurality of blisters on each blister card with the medications corresponding to the plurality of selected prescriptions. In printing the one or more customized blister cards, the method may also include printing any or all of medication information, customer information, pharmacy information on an information card, may further include printing dates and time-of-day indicators on each of a plurality daily medication tabs and, still further, may include printing information on the back of each of the plurality of daily medication tabs.

BRIEF DESCRIPTION OF THE DRAWINGS

FIG. 4 is a screen shot of a user-interface page for validating a customer identity on the exemplary medication compliance packaging enrollment system;

FIG. 6 is a screen shot of a user-interface page for requesting transfer of a prescription using the exemplary medication compliance packaging enrollment system;

FIG. 11 is a screen shot of a user-interface page for reviewing the details of an order using the exemplary medication compliance packaging enrollment system;

FIG. 12 is a screen shot of a user-interface page for adjusting a pill-count using the exemplary medication compliance packaging enrollment system;

FIG. 13 is a screen shot of a user-interface page for confirming order details using the exemplary medication compliance packaging enrollment system;

FIG. 16 is a screen shot of a user-interface page for answering a delivery question using the exemplary medication compliance packaging enrollment system;

FIG. 18 is a screen shot of a user-interface page for modifying pharmacy pick-up date and time using the exemplary medication compliance packaging enrollment system;

FIG. 20 is a screen shot of a user-interface page for searching for customer and order information using the exemplary medication compliance packaging enrollment system.

DETAILED DESCRIPTION

Figure 1A:
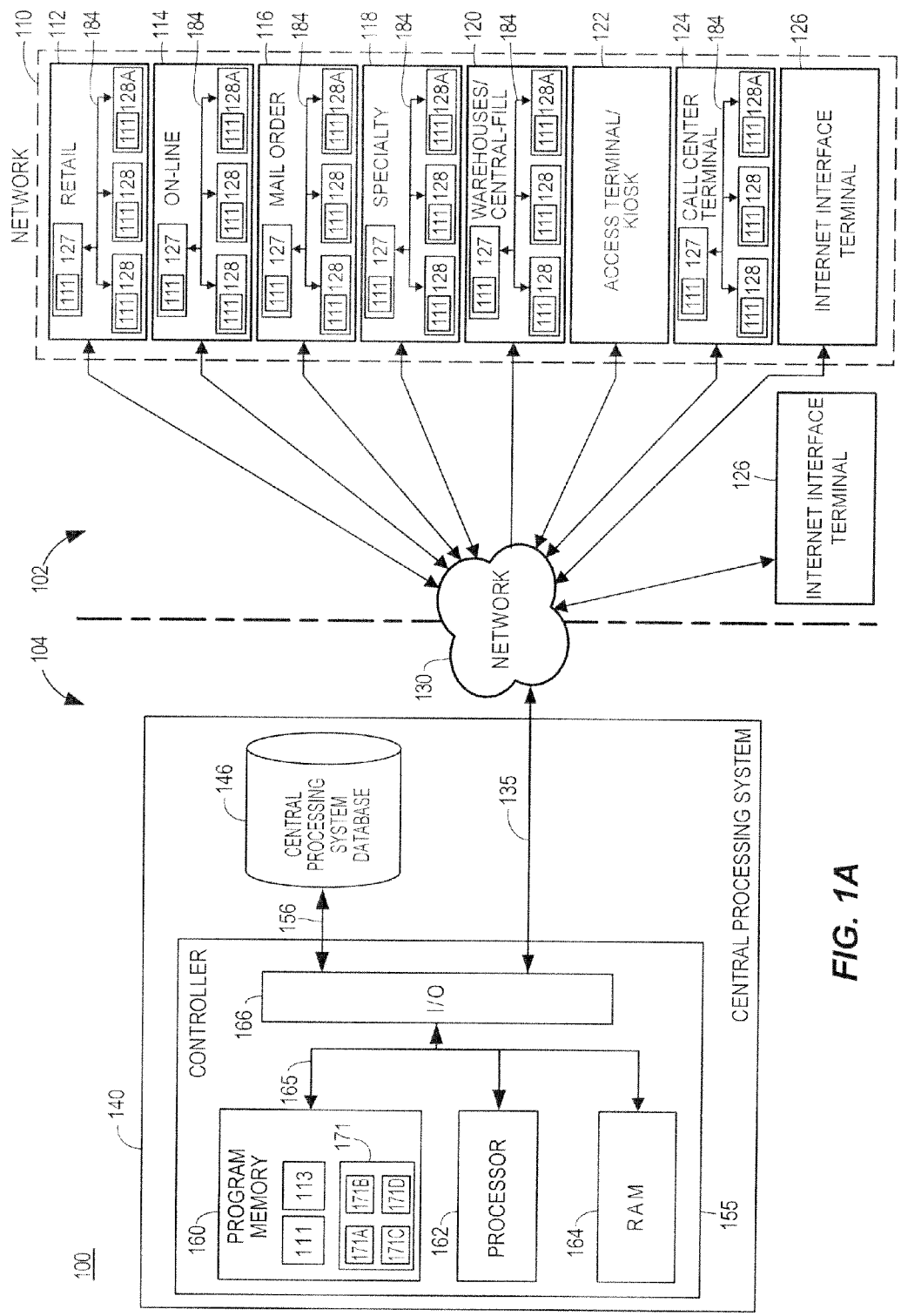
FIG. 1A illustrates a block diagram of a computer network and system on which an exemplary medication compliance packaging enrollment system may operate in accordance with the described embodiments.
Figure 1B:
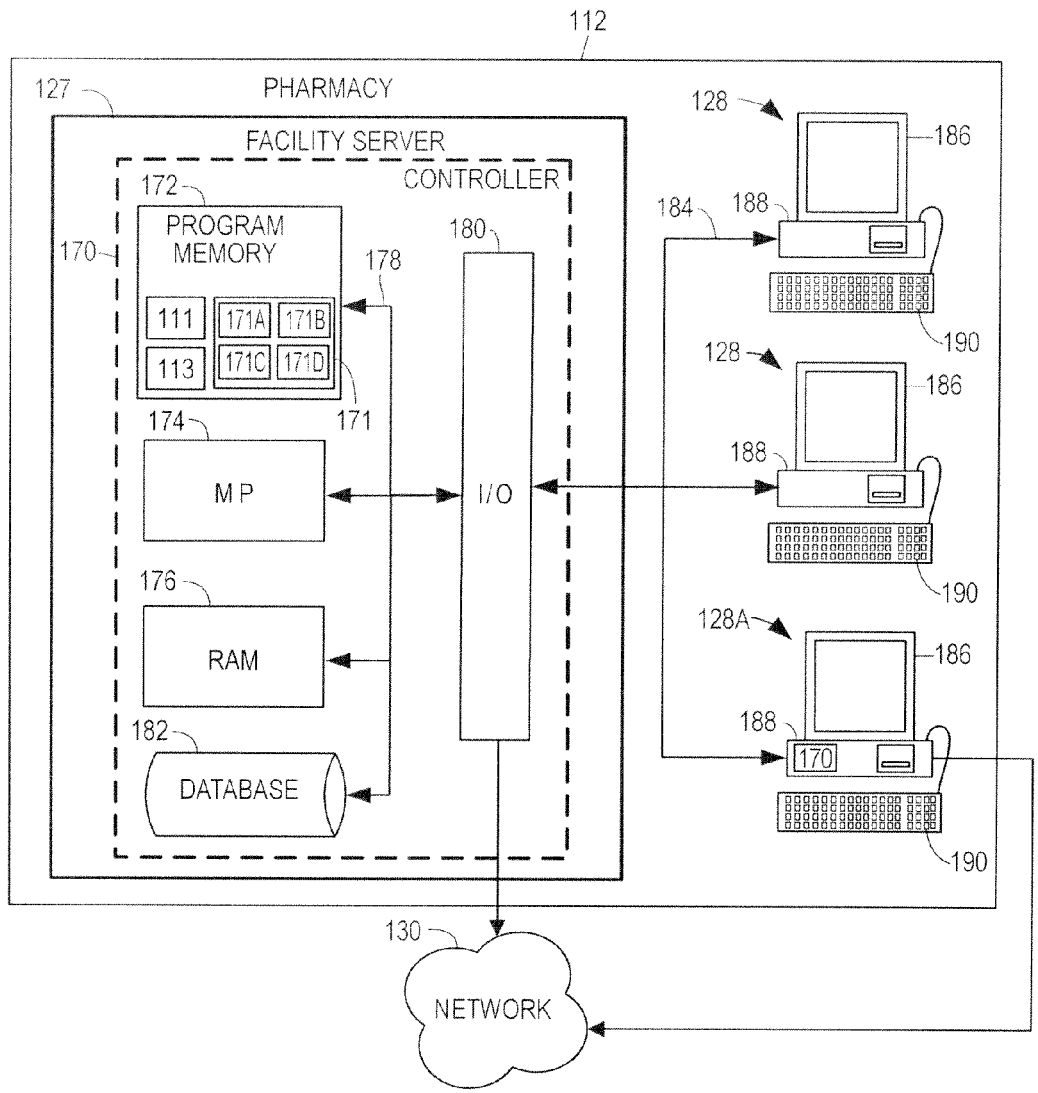
FIG. 1B illustrates a block diagram of a computer server and computer terminals on which an exemplary medication compliance packaging enrollment system may operate in accordance with the described embodiments.

FIGS. 1A and 1B, illustrate various aspects of an exemplary architecture implementing an enrollment system 100 for enrolling a customer in a medication compliance packaging program. In particular, FIG. 1A illustrates a block diagram of the exemplary system 100. The high-level architecture includes both hardware and software applications, as well as various data communications channels for communicating data between the various hardware and software components. The enrollment system 100 may be roughly divided into front-end components 102 and back-end components 104. The front-end components 102 are primarily disposed within a retail network 110 and one or more Internet interface terminals 126. The retail network 110 may include, by way of example and not limitation, retail pharmacies 112 (i.e., a "brick-and-mortar" pharmacy), on-line pharmacies 114 (i.e., a pharmacy at which a customer may place an order via the Internet), mail-order pharmacies 116 (i.e., a pharmacy at which a customer may place an order, and receive a product, by mail), specialty pharmacies 118 (e.g., one that provides specialized services), warehouse and/or central-filling facilities 120 (i.e., facilities that store and/or distribute medications to other pharmacies or directly to customers), customer access terminals ("kiosks") 122, and call centers and/or customer service centers 124 (i.e., facilities where customer service representatives assist customers via telephone, Internet, or other means). Physician access terminals (not shown) may also be part of the retail network 110. Of course, the retail pharmacies 112, on-line pharmacies 114, mail-order pharmacies 116, and specialty pharmacies 118 need not be part of the retail network 110, but may also exist independently. The pharmacies 112, as well as other facilities within the retail network 110, may be located, without limitation, in separate geographic locations from each other, including different areas of the same city, different cities, different states or territories, or even different countries. Each of the facilities within the retail network 110 may include one or more workstations 128. The workstations 128 are local computers executing various pharmacy management-related applications. Pharmacists and other pharmacy personnel, including customer service representatives, warehouse personnel, etc., (referred to collectively herein simply as "pharmacists", and not shown in FIG. 1A), use the workstations 128 to access customer information, enter new prescriptions, access insurance and payment information and so forth. Of course, while the enrollment system 100 is described herein as implemented within a retail network 110, the enrollment system 100 may also be implemented within a stand-alone pharmacy (i.e., a pharmacy that is not part of any retail network or chain).

As used herein, the term medication may be read to mean any substance that may be distributed by a pharmacy or by a pharmacist, including those substances that may be obtained without a prescription (i.e., "over the counter"). Thus, while the embodiments described herein contemplate a compliance packaging program for prescription medications, other substances (e.g., nutritional supplements, over-the-counter medications, etc.) may also be dispensed with one or more prescription medications. The refill of these other substances may likewise be aligned with one or more prescription medications. Of course, the methods described herein may also be used to align and dispense two or more non-prescription substances, even if none of the two or more non-prescription substances is aligned or dispensed with a prescription medication. Also, as used herein, the term "customer" may be, by way of example, a patient (i.e., the person named on the prescription), a guardian (e.g., the parent of a child named on the prescription), a caregiver (i.e., anyone who takes care of a patient or picks up the medication on the patient's behalf), etc. While term "customer" is used interchangeably with the term "patient," in this specification the term "customer" is used primarily so as to avoid confusion. Thus, a customer may be a patient (as where a person picks up his/her own prescriptions), but a customer may also be, by way of example, a parent picking up a prescription for a child (i.e., a guardian), a husband picking up a prescription for his wife, a home-care nurse picking up a prescription for one or more patients, a care facility director (or other personnel) picking up prescriptions for one or more patients, etc.

Returning now to FIG. 1A, those of ordinary skill in the art will recognize that the front-end components 102 could also comprise a plurality of facility servers 127 and client device terminals 128A disposed within the various facilities that make up the retail network 110, instead of, or in addition to, a plurality of pharmacy workstations 128. Each of the facilities within the retail network 110 may include one or more facility servers 127 that may facilitate communications between the client device terminals 128A and the back-end components 104 via a digital network 130, described below, and may store information for a plurality of customers/employees/accounts/etc. associated with each facility. Of course, a local digital network 184 may also operatively connect each of the workstations 128 to the facility server 127. Unless otherwise indicated, any discussion of the workstations 128 also refers to the facility servers 127 and the client device terminals 128A, and vice versa. As used herein, the term "pharmacy" refers to any of these facilities (e.g., call centers 124, kiosks 122, Internet interface terminals 126, central-filling facilities 120, etc.) in addition to the retail pharmacies 112 described above.

The front-end components 102 communicate with the back-end components 104 via the digital network 130. The digital network 130 may be a proprietary network, a secure public Internet, a virtual private network or some other type of network, such as dedicated access lines, plain ordinary telephone lines, satellite links, combinations of these, etc. Where the digital network 130 comprises the Internet, data communication may take place over the digital network 130 via an Internet communication protocol. The back-end components 104 include a central processing system 140. The central processing system 140 may include one or more computer processors 162 adapted and configured to execute various software applications and components of the enrollment system 100, in addition to other software applications, such as the medication management system disclosed in application Ser. No. 11/959,430, entitled "COMPREHENSIVE MEDICATION MANAGEMENT SYSTEM," and filed on Dec. 18, 2007, or a prescription alignment system such as either of those disclosed in application Ser. No. 12/276,053, entitled "METHOD AND SYSTEM FOR CALCULATING AN ALIGNMENT DATE FOR PRESCRIPTIONS," and filed on Nov. 21, 2008, and application Ser. No. 11/781,926, entitled "SYSTEM AND METHOD OF PRESCRIPTION ALIGNMENT," and filed on Jul. 23, 2007, all three of which are hereby incorporated herein by reference. The central processing system 140 further includes a database 146. The database 146 is adapted to store data related to the operation of the pharmacies 112 and the enrollment system 100. The central processing system 140 may access data stored in the database 146 when executing various functions and tasks associated with the operation of the enrollment system 100.

Although the enrollment system 100 is shown to include one central processing system 140 and one pharmacy 112, it should be understood that different numbers of computers and pharmacies may be utilized. For example, the digital network 130 may interconnect the enrollment system 100 to a plurality of included central processing systems 140 and hundreds of included pharmacies 112 (or other facilities) within the retail network 110. According to the disclosed example, this configuration may provide several advantages, such as, for example, enabling near real-time uploads and downloads of information as well as periodic uploads and downloads of information. This provides for a primary backup of all the information generated in the process of updating and accumulating pharmacy data.

FIG. 1A also depicts one possible embodiment of the central processing system 140. The central processing system 140 may have a controller 155 operatively connected to the database 146 via a link 156 through an input/output (I/O) circuit 166. It should be noted that, while not shown, additional databases may be linked to the controller 155 in a known manner.

The controller 155 includes a program memory 160, the processor 162 (may be called a microcontroller or a microprocessor), a random-access memory (RAM) 164, and the input/output (I/O) circuit 166, all of which are interconnected via an address/data bus 165. It should be appreciated that although only one microprocessor 162 is shown, the controller 155 may include multiple microprocessors 162. Similarly, the memory of the controller 155 may include multiple RAMs 164 and multiple program memories 160. Although the I/O circuit 166 is shown as a single block, it should be appreciated that the I/O circuit 166 may include a number of different types of I/O circuits. The RAM(s) 164 and the program memories 160 may be implemented as semiconductor memories, magnetically readable memories, and/or optically readable memories, for example. A link 135 may operatively connect the controller 155 to the digital network 130 via the I/O circuit 166.

FIG. 1B depicts one possible embodiment of the front-end components 102 located in the pharmacy 112 (or any of the other facilities of the retail network 110) from FIG. 1A. Although the following description addresses the design of one pharmacy 112, it should be understood that the design of other pharmacies 112 may be different. Also, each of the pharmacies 112 may have various different structures and methods of operation. It should also be understood that while the embodiment shown in FIG. 1B illustrates some of the components and data connections that may be present in a pharmacy 112, it does not illustrate all of the data connections that may be present in a pharmacy 112. For exemplary purposes, one design of a pharmacy is described below, but it should be understood that numerous other designs may be utilized.

Each of the facilities has one or more pharmacy workstations 128 and/or a facility server 127. The digital network 184 operatively connects the facility server 127 to the plurality of workstations 128 and/or to the client device terminals 128A. The digital network 184 may be a wide area network (WAN), a local area network (LAN), or any other type of digital network readily known to those persons skilled in the art. The digital network 130 may operatively connect the facility server 127, the workstations 128, and/or the client device terminals 128A to the central processing system 140 depicted in FIG. 1A.

Each workstation 128, client device terminal 128A, or facility server 127 includes a controller 170. Similar to the controller 155 from FIG. 1A, the controller 170 includes a program memory 172, a microcontroller or a microprocessor (MP) 174, a random-access memory (RAM) 176, and an input/output (I/O) circuit 180, all of which are interconnected via an address/data bus 178. In some embodiments, the controller 170 may also include, or otherwise be communicatively connected to, a database 182. The database 182 (and/or the database 146 of FIG. 1A) includes data such as customer records, insurance information records, and other rules and miscellaneous information. As discussed with reference to the controller 155, it should be appreciated that although FIG. 1B depicts only one microprocessor 174, the controller 170 may include multiple microprocessors 174. Similarly, the memory of the controller 170 may include multiple RAMs 176 and multiple program memories 172. Although the figure depicts the I/O circuit 180 as a single block, the I/O circuit 180 may include a number of different types of I/O circuits. The controller 170 may implement the RAM(s) 176 and the program memories 172 as semiconductor memories, magnetically readable memories, and/or optically readable memories, for example.

Either or both of the program memories 160 and 172 may also contain software 171 related to the enrollment process, for execution within the processors 162 and 174, respectively. The software 171 may perform the various tasks associated with enrollment, and may be a single module 171A or a plurality of modules 171A, 171B, 1710, etc. For example, software module 171A may retrieve information about the customer (i.e., a customer record), including information about the customer's prescriptions, insurance plan, etc. from the database 146 or the database 182. A software module 171B may include an alignment engine, such as the alignment engine, for aligning refill dates of the various prescriptions. A software module 171C may provide authentication services for the enrollment system 100, allowing customers and/or other users to access the system. An enrollment processing software module 171D may collect and process data related to enrollment in the medication compliance packaging program. Of course, it is the nature of object-oriented programming that the software 171 may include other or fewer modules, the various software modules 171A-D described here may each include multiple sub-modules, that one module may invoke others of the modules, and the tasks performed by the various modules may be divided among the modules differently or may be part of a single module. Moreover, the module or modules 171 may reside on the same or different workstations and/or servers. The program memories 160 and 172 may also contain a user-interface application 111 for allowing a user, such as the pharmacist, a customer service representative, or a customer, to input and view data associated with the enrollment system 100. In one embodiment, the user-interface application 111 is a web browser client, and the facility server 127 or the central-processing system 140 implements a server application 113 for providing data to the user-interface application 111. However, the user-interface application 111 may be any type of interface, including a proprietary interface, and may communicate with the facility server 127 or the central processing system 140 using any type of protocol including, but not limited to, file transfer protocol (FTP), telnet, hypertext-transfer protocol (HTTP), etc. Moreover, the user interface application 111 may be running on one of the workstations 128 in a pharmacy 112 (as when the pharmacist is accessing the system), may be operating on a workstation 128 in a call-center 124 (as when a customer service representative is assisting a customer in enrollment), or may be operating on an Internet interface terminal 126 (as when a customer is requesting, enrolling in, and configuring the customer's medication compliance packaging program via an Internet interface terminal 126).

In addition to the controller 170, the workstations 128 and the client device terminals 128A may further include a display 186 and a keyboard 190 as well as a variety of other input/output devices (not shown) such as a scanner, printer, mouse, touch screen, track pad, track ball, isopoint, voice recognition system, digital camera, etc. A pharmacy employee may sign on and occupy each workstation 128 or client device terminal 128A to assist the pharmacy employee in performing his or her duties. Pharmacy employees may sign onto the workstation 128 or the client device terminal 128A using any available technique, such as, for example, entering a user name and password. If a pharmacy employee signs on to the system using a client device terminal 128A, the network 184 communicates this information to the facility server 127, so that the controller 170 may identify which pharmacy employees are signed onto the enrollment system 100 and which workstation 128 or client device terminal 128A the employee is signed onto. This may be useful in monitoring the pharmacy employees' productivity.

The enrollment system 100 provides an interface through which a customer may enroll (or be enrolled) in the medication compliance packaging program or any sort of compliance or medication management system. A customer enrolled in the medication compliance packaging program receives his or her enrolled medications in a special "compliance package." The medication compliance package facilitates proper dosing of each enrolled medication by serving as a customized, prepackaged pill organizer. The compliance package groups all of the customer's daily pills, separated by the day and time of day that the customer takes each dose.

Of course, any number of organizations may be used, and the compliance packaging is not limited to separating doses by day and time of day. For example, instead of multiple cards, each card containing medication for a particular time of day, the medication could be organized into weekly cards. In one embodiment (not shown), a blister card contains 28 blisters, with seven blisters in each of four rows. Each row contains medication for a different time of day (e.g., morning, noon, evening, and night), and the card contains medication for seven days.

In any event, the medication compliance packaging program provides a number of advantages. For example, the program provides a convenient way for a customer to track the medication already taken and know when to take each dose of each medication. The compliance package eliminates the need for multiple individual vials for each medication. In some embodiments, the compliance package facilitates easy transportation of individual doses so that a customer may carry only the medication necessary for a short errand or even for a long trip. In one embodiment, the medication compliance packaging program also includes automatic refills of the medications so that the customer receives a new medication compliance package each month. The system 100 facilitates automatic refills by aligning the various prescriptions so that each requires a refill at the same time. Moreover, in some embodiments, the system 100 automatically charges the customer's credit or debit account for the cost of the medication and the cost of the program, eliminating the need for the customer or the pharmacy to initiate payment.

Figure 2A:
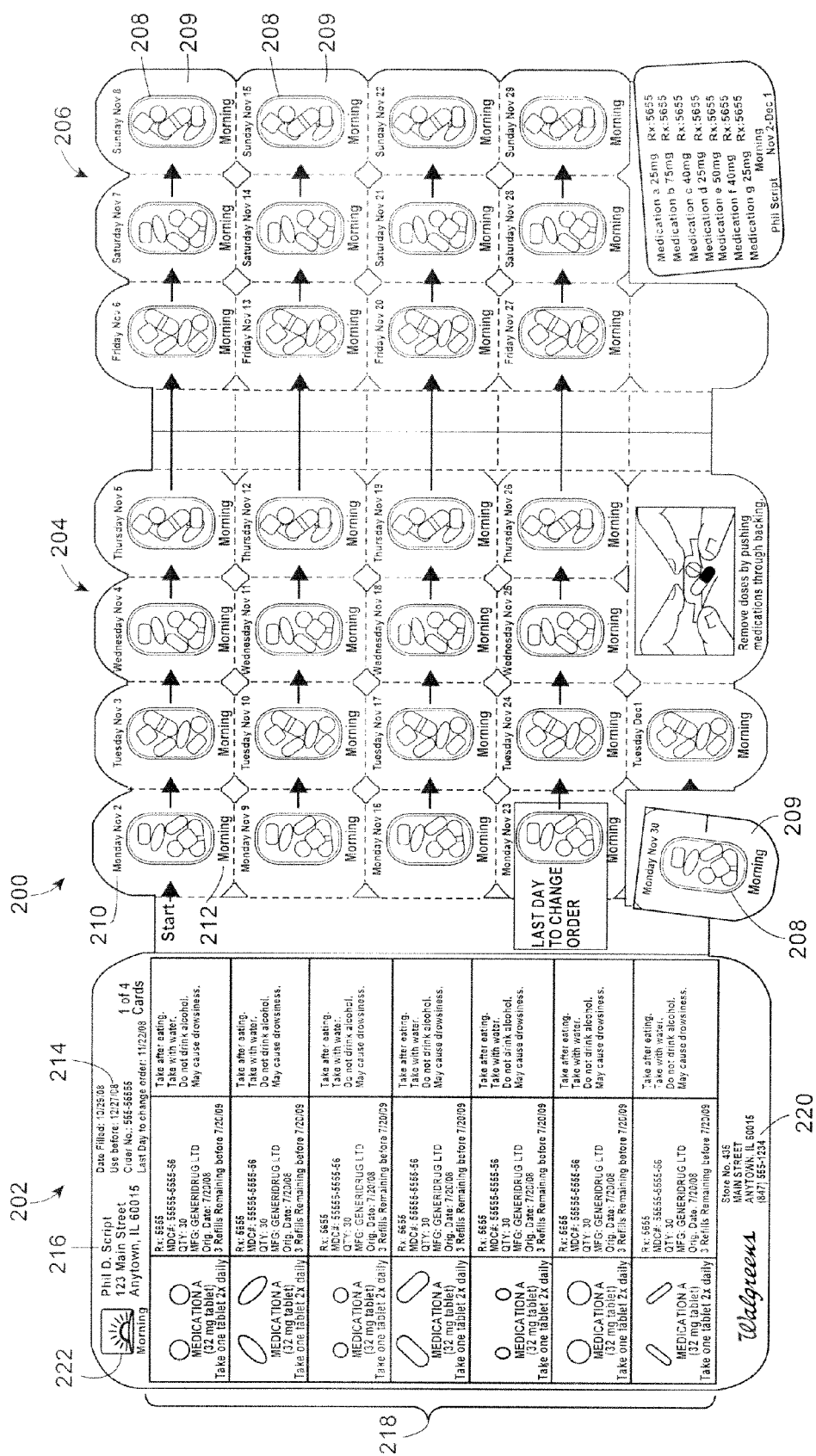
FIG. 2A illustrates a blister card for use in an exemplary medication compliance packaging program.

Compliance packaging may take any number of forms, including packaging that uses blisters, pouches, or other means to separately contain a volume of various medications. FIGS. 2A, 2B, 2C, 2D, and 2E illustrate one embodiment of the compliance packaging employed in the medication compliance packaging program. In particular, FIG. 2A illustrates a blister card 200 for storing multiple doses of medication for simultaneous ingestion, such as the blister card described in application Ser. No. 12/130,365, entitled "MULTI-DOSE BLISTER CARD PILLBOOK," and filed on May 30, 2008, which is hereby incorporated herein by reference. The blister card 200 includes a cover 202, a center medication portion 204, and an outer medication portion 206. The medication portions 204 and 206 of the blister card 200 include a plurality of blisters 208, each blister located on a detachable blister tab 209. Each of the blisters 208 is sized to hold a plurality of medications to be ingested at the same time. In the embodiment depicted in FIG. 2A, the blister card 200 includes 30 blisters 208. Each blister tab 209 includes an indicator 210 of the day and date that the medication in the blister 208 should be ingested, and an indication 212 of the time of day (e.g., morning, noon, evening, or night) to ingest the medication. The inside of the cover 202 includes order information 214, customer information 216, a medication information area 218, pharmacy information 220, and a time-of-day indicator 222. The medication information area 218 may include various information for each prescribed medication, such as a photograph of the medication, the medication manufacturer, the name and strength of the medication, directions for taking the medication, the prescription number, the quantity of the medication, the manufacturer of the medication, the name of the prescriber and the name or initials of the pharmacist, and auxiliary messages (e.g., warnings and alerts about the specific medication). The time-of-day indicator 222, which may include an icon, on the inside of the cover 202 corresponds to indication 212 of the time of day to ingest the medication. Additional areas on the blister card 200 may include opening directions (which may be illustrations and/or text) and a medication wallet card that lists the customer's medications on a card that may be separated from the blister card 200. The medication portions 204 and 206 fold together such that the blisters 208 on the portion 204 are adjacent to (i.e., nested between) the blisters 208 on the portion 206, and the cover 202 folds over the folded medication portions 204 and 206. In doing so, the cover 202 and the medication portions 204 and 206 of the blister card 200 cooperate to form a tri-fold "book" that may easily be packaged with other blister cards 200 (see FIG. 2D).

Figure 2B:
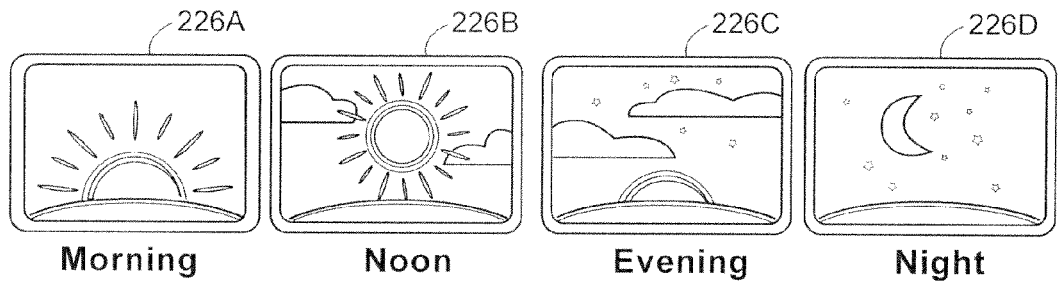
FIG. 2B illustrates exemplary icons for use in the exemplary medication compliance packaging program.

The compliance packaging may include one blister card 200 for each time of day for which there is medication that the customer must take. For example, if the customer has one medication that is taken four times a day (e.g., morning, noon, evening, and night), the compliance packaging would include four blister cards 200. Likewise, if the customer takes one medication every morning and two medications every night, the compliance packaging would include two blister cards 200 (e.g., morning and night). In some instances, of course, the compliance packaging could include more than four cards (e.g., when multiple cards are needed for a particular time of day due to the number or size of the medications, or when the customer takes medication at more than four times a day), or only a single card. FIG. 2B illustrates four exemplary icons 226 that may indicate the time of day in various locations on the blister card 200. The icons 226 depicted in FIG. 2B include a "morning" icon 226A, a "noon" icon 226B, an "evening" icon 226C, and a "night" icon 226D. Of course, the icons 226 may be in color, and may be any icon or number of icons that communicates the intended time of day to the viewer. Additionally, the icons may be associated with (or even replaced by) text, and the text and/or icons may, in some embodiments, be changed according to the customer's desires.

Figure 2C:
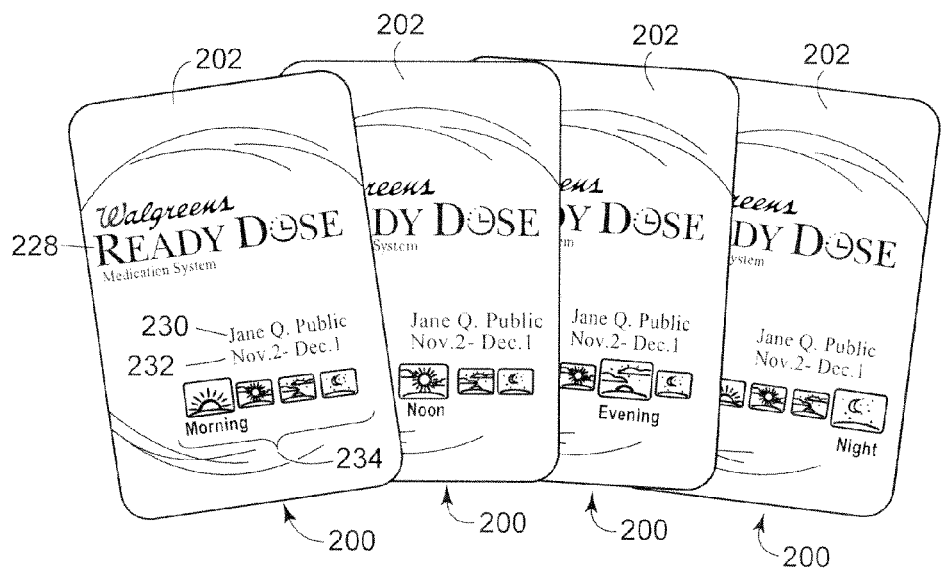
FIG. 2C illustrates a group of blister cards for use in the exemplary medication program.
Figure 2D:
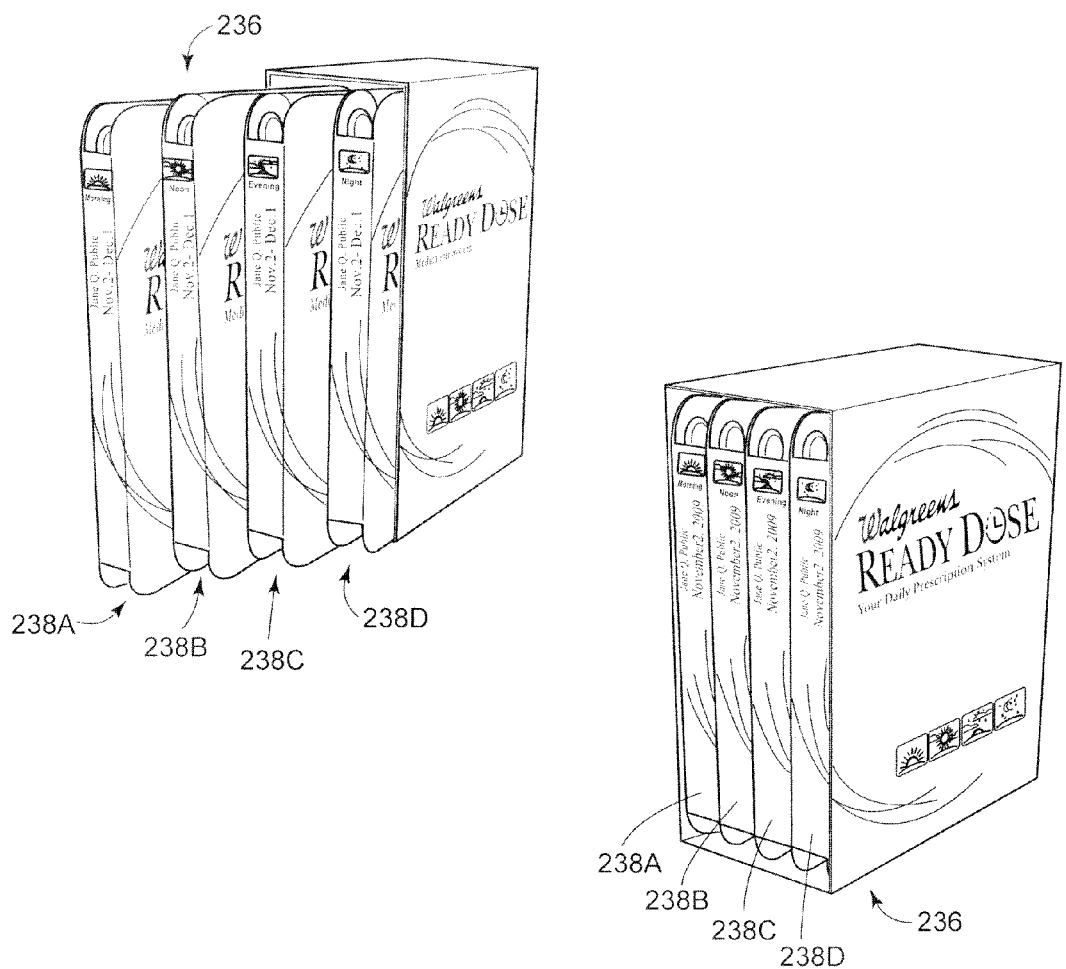
FIG. 2D illustrates an exemplary medication compliance package in accordance with the described embodiments.

FIG. 2C illustrates the outside of the cover 202 depicted on the blister card 200 depicted in FIG. 2A. In addition to the Pharmacy and/or product name or logo 228, the outside of the cover 202 may also include the name 230 of the customer, an indication 232 of the dates for which the blister card 200 contains medication, and an indication 234 of the time of day at which medication in the blister card 200 should be ingested. FIG. 2D depicts a complete medication compliance package 236 for a customer that takes medications at four times each day. The package 236 includes four blister cards 238, including a blister card 238A for morning, a blister card 238B for noon, a blister card 238C for evening, and a blister card 238D for night.

Figure 2E:
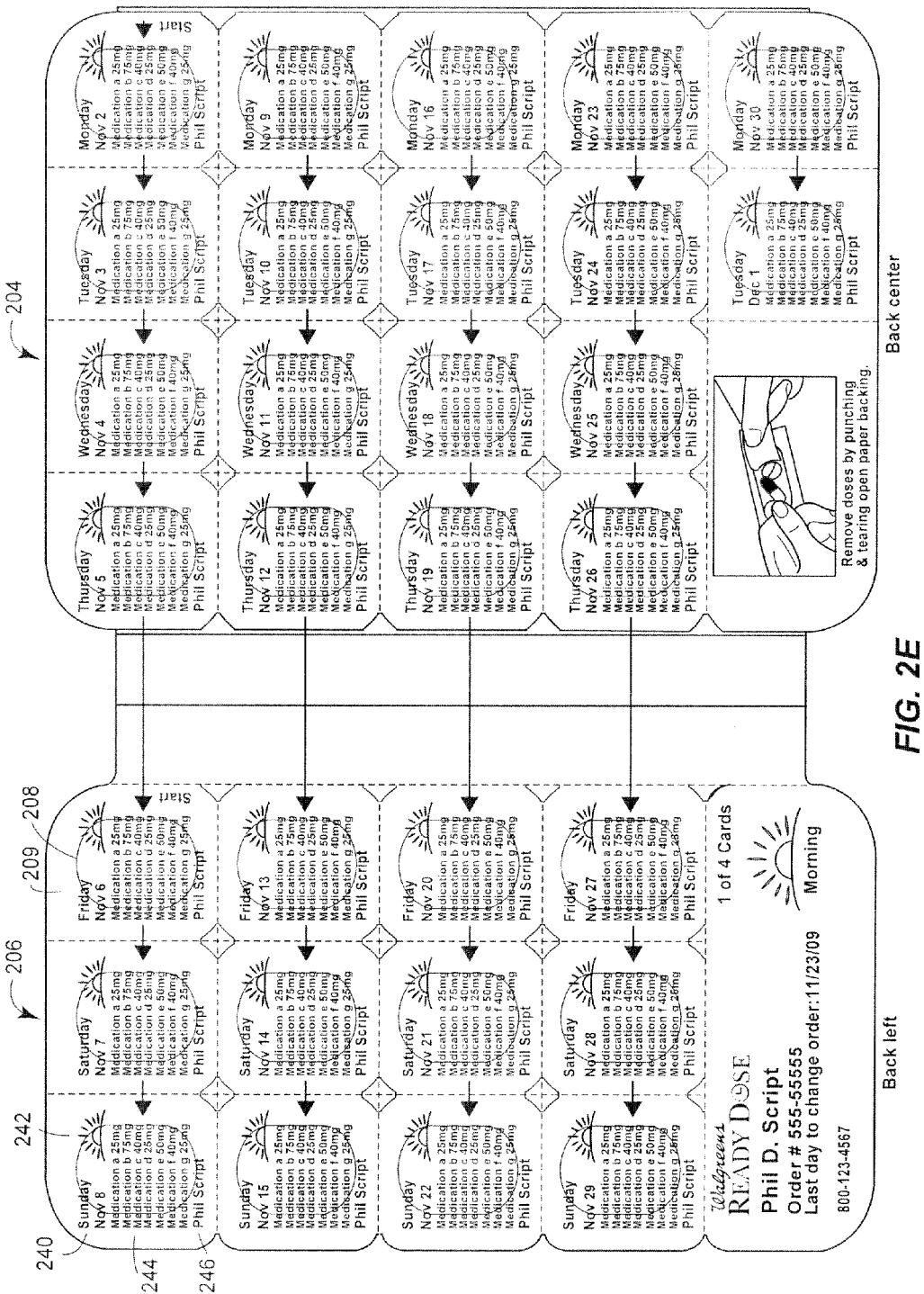
FIG. 2E illustrates a rear view of a portion of the blister card of FIG. 2A.

FIG. 2E depicts the back of the center and outer medication portions 204 and 206, respectively. The back of each of the blister tabs 209 includes an indication 240 of the day and date on which the medication in the blister 208 should be ingested, an indication 242 (which may be an icon) of the time of day that the medication in the blister 208 should be ingested, a list 244 including each medication enclosed in the blister 208, and the customer name 246.

Enrolling in the medication compliance packaging program requires inputting various data about the customer and the prescriptions into the enrollment system 100 and, in particular, into the enrollment processing software module 171D. In one embodiment, the customer inputs the various data into the enrollment processing software module 171D by logging into the enrollment system 100 through the Internet interface terminal 126 (e.g., through a personal computer connected to the Internet) or through an access terminal or kiosk 122. In another embodiment, a pharmacist or customer service representative accesses the enrollment system 100. In any event, the user-interface software 111 running on the Internet interface terminal 126 receives a series of web pages (or other data) from the server application 113. The web pages provide the customer with information and instructions, and allow the customer to input information into the enrollment processing software module 171D and make selections related to the enrollment process. In an alternate embodiment, a customer service representative (e.g., at a call-center) inputs the various data into the enrollment processing software module 171D by logging into the enrollment system 100 through the workstation 128 at the call-center 124. The user-interface software 111 running on the workstation 128 at the call-center 124 receives a series of web pages (or other data) from the server application 113. The web pages provide the customer service representative with information and instructions, and allow the customer service representative to input information into the enrollment processing software module 171D and make selections related to the enrollment process, presumably while talking to the customer on the telephone so that the customer service representative may ask the customer questions and receive information from the customer. Of course, the web pages received by the customer may be the same web pages received by the customer service representative, or may be different web pages than those received by the customer service representative. In one embodiment, the customer service representative receives some web pages that are the same as those that a customer would receive, and some web pages to which a customer would not have access. In any event, each of the web pages or screens may present to the customer various display elements for providing information to the customer or receiving information from the customer. Though one embodiment, described herein, uses web pages to convey and receive information, any reference to a "web page" or a "page" could also refer to a screen presented by any proprietary or non-proprietary user-interface application 111. This may include any way of displaying information, including the use of a pop-up window, a modal-window, an overlay screen, etc. As generally known in the art, the display elements may include text (some of which text may serve as links to additional information or other screens or web pages), data entry boxes, pull-down lists, radio buttons, check boxes, images, and buttons. Throughout this specification, it is assumed that the customer activates the various elements (e.g., buttons, pull-down lists, links, etc.) of the screen or web page using a mouse or other pointing device. Thus, throughout the specification, the terms "click" and "clicking" may be used interchangeably with the terms "select," "activate," or "submit" to indicate the selection or activation of one of the elements. Of course, other methods (e.g., keystrokes, voice commands, etc.) may also be used to select or activate the various elements. Moreover, throughout this specification, the terms "link" and "button" are used interchangeably to refer to a control that may be activated by clicking on the control.

Regardless of the precise embodiments of the user-interface application 111 and the server application 113, the user-interface application 111 communicates information to and from the server application 113. For example, the server application 113 provides customer and prescription information to the user-interface application 111. The user-interface application 111 formats and/or displays the received information, accepts input from a user (e.g., a customer or a customer service representative) and transmits the input back to the server application 113. Throughout this specification, it should be understood that some portion of the data displayed by the user-interface application 111 originates at the server application 113, and that the user-interface application 111 transmits data entered by the user back to the server application 113.

Figure 3:
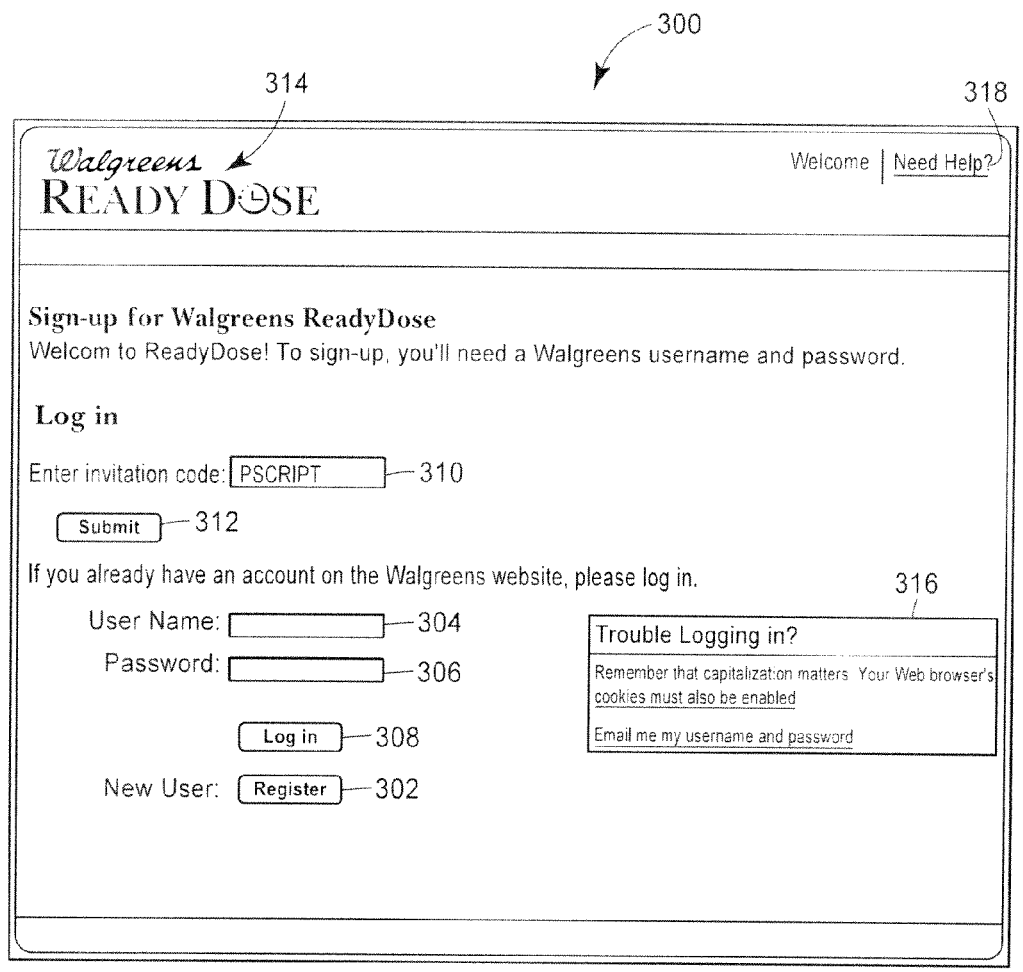
FIG. 3 is a screen shot of a user-interface page for logging into the exemplary medication compliance packaging enrollment system.

When a customer attempts to access the enrollment system 100 by, for example, using the user-interface software 111 (i.e., a web browser) on the Internet interface terminal 126, the server 113 may present the customer with a log-in page 300, such as the log-in page 300 illustrated in FIG. 3. The log-in page 300 may allow the customer to register as a new user by selecting a "Register" button 302 or may allow the customer to input a user name 304 and a password 306 if, for example, the customer has previously registered with the pharmacy providing the medication compliance packaging service. After entering the user name 304 and the password 306, the customer may select a "Log In" button 308 to submit the information to the server 113, which may authenticate the user using the authentication module 1710. In one embodiment, the log-in page 300 allows the customer to input an invitation code 310, such as a code received by the customer (e.g., by mail or e-mail) and associated with the customer. After inputting the invitation code 310, the customer may select a "Submit" button 312, which may use the invitation code 310 to authenticate the user associated with the code (using the authentication module 171C, for example) and retrieve customer information. In an alternate embodiment, the invitation code 310 may be a discount code included in an offer for the medication compliance packaging service. Of course, the login page need not include all of these elements as where, for example, another program or interface is responsible for setting up a user account. Where another program is responsible for setting up a user account, the log-in page 300 may include only the user name and password fields 304 and 306, respectively, and the "Log In" button 308. In any event, the log-in page 300 may also include other elements, such as information 316 related to logging into the enrollment system 100, a "Help" link 318 that may provide additional helpful information to the customer, and a logo 314 such as the logo 314 depicted in FIG. 3, which logo may include a pharmacy logo and/or a medication compliance packaging program logo. The logo 314 may also be a link to the main pharmacy web page or the main medication compliance packaging program web page.

In some embodiments, the customer may be presented with an identity validation page 320, such as the identity validation page 320 depicted in FIG. 4. The enrollment system 100 and, in particular, the authentication module 1710 may use the identity validation page 320 to further verify a customer's identity. In one embodiment, the identity validation page 320 validates the identity of the customer when the customer is registering for the system. In another embodiment, the identity validation page 320 provides additional validation of the customer after the customer enters a user name 304 and a password 306 on the log-in page 300. The identity validation page 320 may ask the customer to enter into a field 322 information that could validate the identity of the customer. In one embodiment, the identity validation page 320 requests the customer to enter a prescription number for one of the prescriptions associated with the customer's pharmacy account. Instructions 324 on the page 320 and an image 326 on the identity validation page 320 may help the customer identify the particular information to be entered into the field 322. For example, the image 326 may show a prescription label 328 showing a highlighted prescription number 330. After the customer enters the requested information (e.g., the prescription number) into the field 322, the customer may select a "Continue" button 332 to submit the information in the field 322 to the server 113 for validation by the authentication module 171C. A "Cancel" button 334 may also be provided to allow the customer to exit the enrollment process. Other elements on the identity validation page 320 may include a customer name 336; a "Home" link 338 that, for example, returns the customer to a default page; the "Help" link 318; a "Logout" link 340 that logs the customer out of the enrollment system 100; and contact information 342 for contacting the pharmacy or an enrollment customer service representative.

Figure 5:
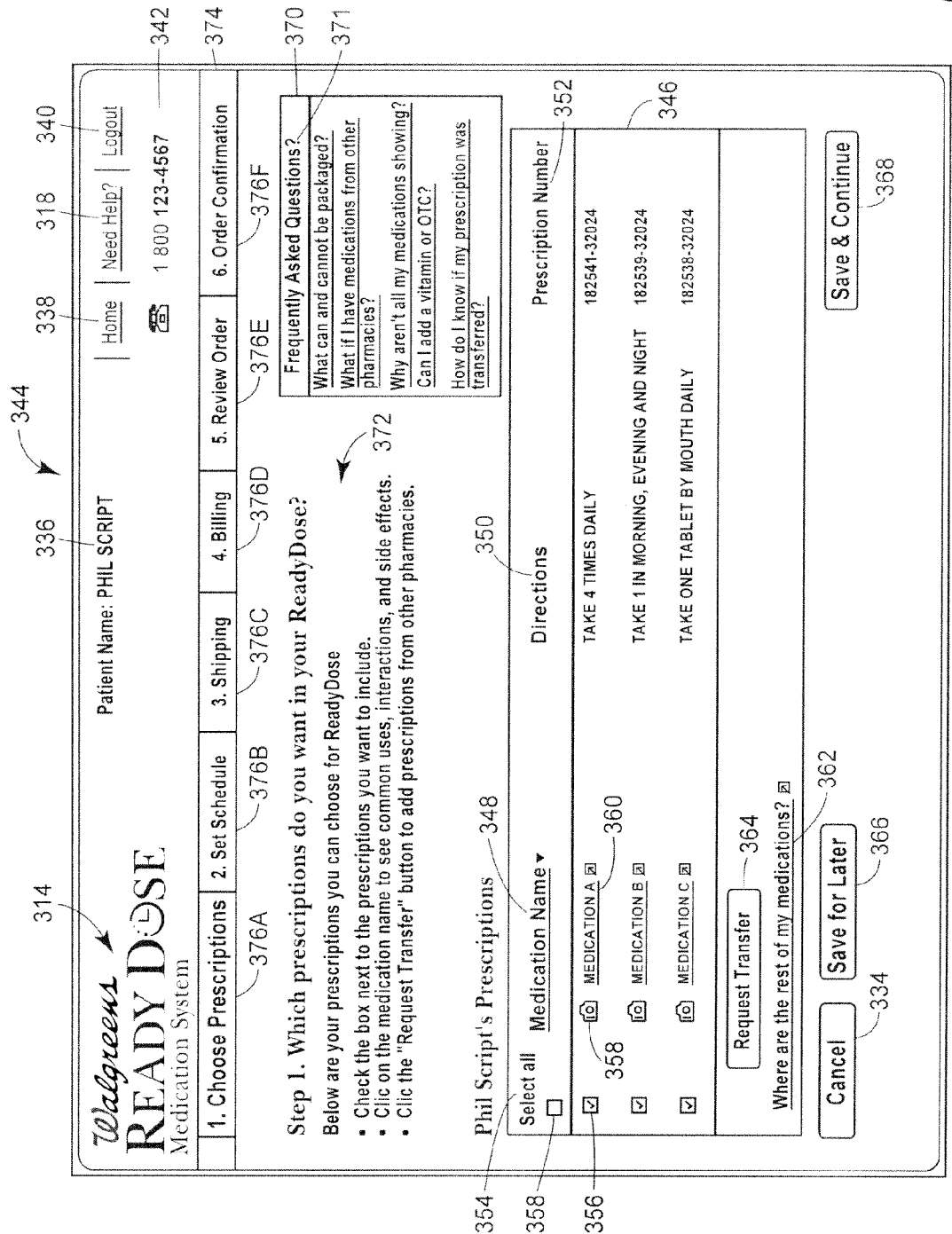
FIG. 5 is a screen shot of a user-interface page for selecting prescriptions to include in the exemplary medication compliance packaging enrollment system.

After completing the validation process by submitting the requested information in the field 322, and assuming successful validation, the server 113 presents a prescription selection page 344 to the customer via the user-interface application 111. FIG. 5 depicts one embodiment of a prescription selection page 344. The prescription selection page 344 presents prescription information 346 to the customer. The prescription information 346 may include any information related to the prescriptions. For example, the prescription information 346 may include a column 348 listing the name of each prescription medication, a column 350 listing the directions for taking each medication, and a column 352 listing a prescription number for each medication. While not depicted in FIG. 5, the prescription information 346 may include information such as the last date the prescription was filled, the prescribed day supply for the prescription, the quantity of the medication, the prescriber name, or any other information about the prescription. An additional column 354 may include a series of check boxes 356 for allowing the customer to select individual medications appearing on the list. Additionally, the prescription information 346 may include a "Select All" check box 358 (or similar button or link) for selecting all of the prescriptions included in the prescription information 346, and may also include a link or button 358 to display a picture of the medication and/or a link or button 360 to display additional information about the medication.

The prescriptions listed in the prescription information 346 may include all prescriptions associated with the customer or, optionally, only prescriptions that are eligible for the compliance packaging program. Various prescribed medications may be ineligible for the compliance packaging program for any number of reasons related to regulations, packaging restrictions, or prescription details. As one example, it may not be possible to package certain medications in the compliance packaging (e.g., in the blister cards 200) due to the size of the medication, the form in which the medication is dispensed (e.g., creams, powders, liquids, inhalers, etc.), or manufacturer packaging of the medication. As another example, the prescription may be for a quantity that does not allow the prescribed medication to be dispensed in the compliance packaging (e.g., where a blister card 200 is for a 30-day period and a prescription prescribes a quantity other than 30 days), the prescription may be closed (i.e., the prescription is expired, the prescribing doctor has discontinued the prescription, or the prescription has been transferred to another pharmacy), the prescription may prescribe a fraction (e.g., half) of a pill, there may be no refills remaining for the prescription, etc. In any event, a link 362 may provide additional information about prescriptions that are ineligible for the compliance packaging program and/or prescriptions not displayed with the prescription information 346. Of course, the additional information displayed when the customer selects the link 362 may also be displayed as an overlaid window (not shown), a pop-up window (not shown), a new window (not shown), or in any other manner known to those of ordinary skill in the art.

Referring still to FIG. 5, the prescription selection page 344 may also include a "Save for Later" button 366. Activation of the "Save for Later" button 366 saves the information entered so that the customer may complete the enrollment process at a later time. Selecting the "Save for Later" button 366 provides the customer with an opportunity to either log out of the enrollment system 100 or to return to the enrollment process (e.g., by opening another window or displaying a different web page). Activation of a "Save & Continue" button 368 may save the information entered by the customer on the prescription selection page 344, and cause the user-interface application 111 to navigate to the page for the next step of the enrollment process, while activation of a "Cancel" button 334 may cancel the enrollment process. Other elements that may be included on the prescription selection page 344 include the logo 314, the contact information 342, the patient name 336, the "Home" link 338, the "Help" link 318, the "Logout" link 340, and instructions 372 for the page 344. A "Frequently Asked Questions" box 370 may also be included on the prescription selection page 344. The "Frequently Asked Questions" box 370 may display some of the most common questions that customers have, and may provide links 371 to answers for those questions. The links 371 may provide the answers in an overlay window or a pop-up window (not shown), or may navigate away from the prescription selection page 344 to another page. Lastly, the prescription selection page 344 may include a navigation bar 374 for the enrollment process. The navigation bar 374 may include a number of tabs or segments 376, with each segment 376 indicating a different step in the enrollment process. For example, a segment 376A on the navigation bar 374 may indicate the "Choose Prescriptions" step, a segment 376B may indicate a "Set Schedule" step, a segment 376C may indicate a "Shipping" step, a segment 376D may indicate a "Billing" step, a segment 376E may indicate a "Review Order" step, and a segment 376F may indicate an "Order Confirmation" step. The particular segment 376 highlighted indicates the customer's progress through the enrollment process. For example, on the prescription selection page 344, segment 376A is highlighted, indicating the customer is currently at the "Choose Prescriptions" step. Additionally, in some embodiments, selecting the various segments 376 may allow the customer to navigate to other steps in the enrollment process.

Figure 6:
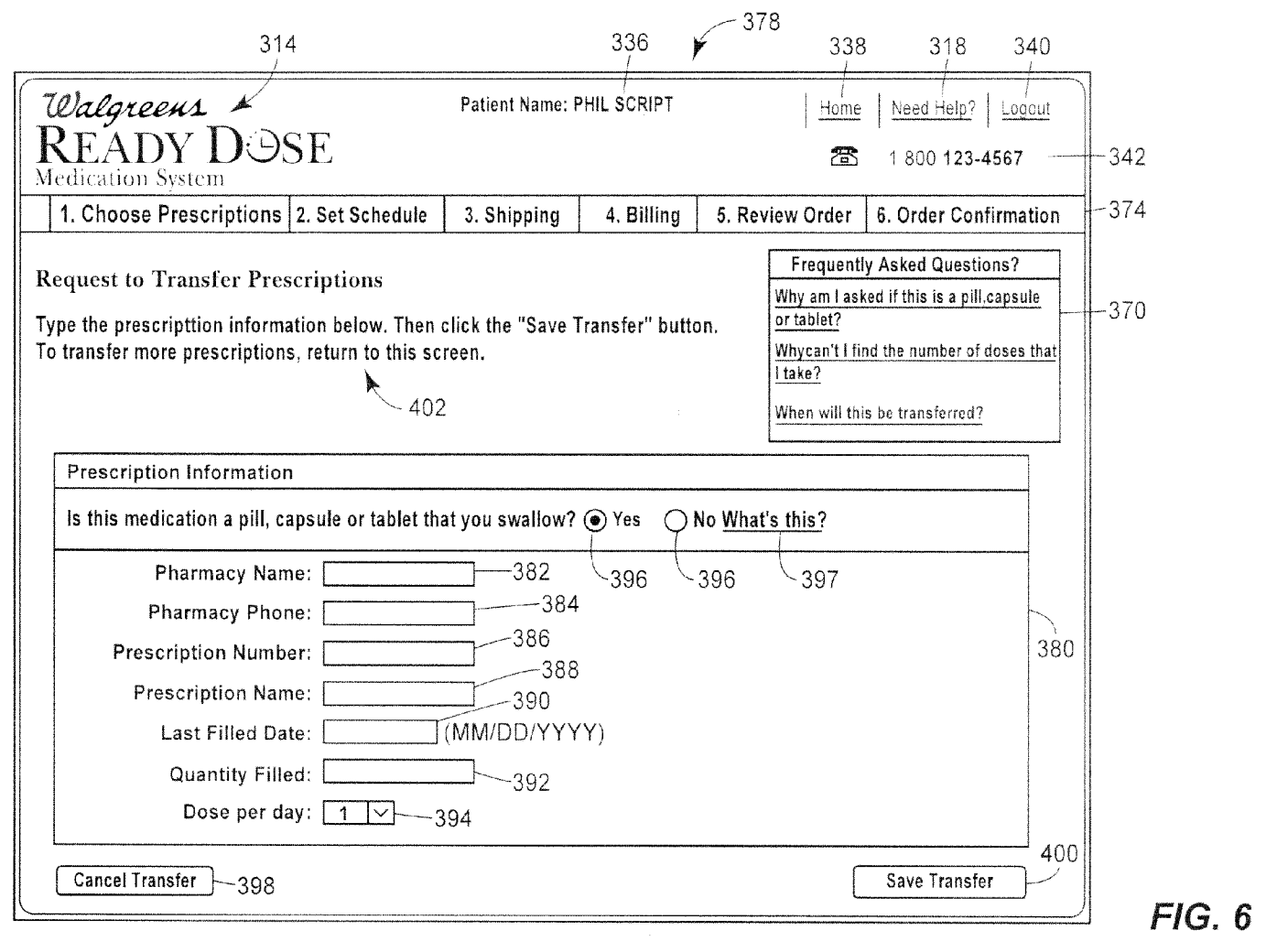

Lastly, the prescription selection page 344 may also include a "Request Transfer" button 364 for displaying a prescription transfer page 378 that allows the customer to request a transfer of a prescription on file at a different pharmacy. FIG. 6 depicts one embodiment of the prescription transfer page 378 discussed above. The prescription transfer page 378 includes a prescription information area 380 for inputting into fields 382-396 information related to the prescription that the customer wants to transfer. Though the information included in the fields 382-396 may include more or less information than detailed herein, in one embodiment the fields 382-396 include a field 382 for the name of the pharmacy that last filled the prescription, a field 384 for the phone number of pharmacy, a field 386 for the prescription number, a field 388 for the prescription name (i.e., the name of the prescribed medication), a field 390 for the date that the prescription was last filled, and a field 394 for the prescribed dose per day. Additionally, the prescription information fields 382-396 may include an indication 396 of whether the medication is dispensed in a form that is eligible for the compliance packaging program (i.e., whether or not the medication is dispensed in one of pill, capsule, or tablet form). The indication 396 may, in some embodiments, allow the customer to enter data into the information fields 382-394 only if the customer indicates that the medication is in a form eligible for compliance packaging and not allow the customer to enter data into the information fields 382-394 if the customer indicates that the medication is not in a form eligible for compliance packaging. Of course, the medication's eligibility for inclusion in the compliance packaging program may also be determined after the prescription has been transferred or, in some embodiments, may not be a consideration. Activation of a link 397 may cause the user interface 111 to display information, in the same screen, a different screen, a pop-up window, etc., about what types of prescriptions are eligible for the compliance program, why the eligibility question is asked, etc.

The prescription transfer page 378 may also include instructions 402 for the prescription transfer page 378, in addition to the pharmacy logo 314, the customer name 336, the "Home" link 338, the "Help" link 318, the "Logout" link 340, the customer service phone number 342, the "Frequently Asked Questions" box 370, and the navigation bar 374. A "Cancel Transfer" button 398 may cause the user-interface application 111 to navigate back to the prescription selection page 344 without saving the data entered into prescription information fields 382-396. A "Save Transfer" button 400 may save the data entered into prescription information fields 382-396 and cause the user-interface application 111 to navigate back to the prescription selection page 344. Upon navigation back to the prescription selection page 344 the user-interface application 111 may display a message indicating the success, failure, or other status of the requested transfer. Additionally, the customer may, of course, select the "Request Transfer" button 364 to request the transfer of an additional prescription.

Figure 7:
FIG. 7 is a screen shot of a user-interface page for setting a medication schedule using the exemplary medication compliance packaging enrollment system.

As described above, selection of the "Save & Continue" button 368 on the prescription selection page 344 will save the information on the prescription selection page 344 and cause the user-interface application 111 to navigate to the next step in the enrollment process and, in particular, to a set schedule page 404, such as the set schedule page 404 depicted in FIG. 7. The set schedule page 404 allows the customer to view, and in some cases modify, how the various medications indicated by the prescriptions selected on the prescription selection page 344 will be packaged in the medication compliance packaging. For example, if, as described above, the medication compliance packaging includes one or more 30-day blister cards 200, with one blister card 200 for each time of day at which the customer takes medication, the set schedule page 404 would allow the customer to view and/or modify how many blister cards 200 they will receive, as well as which medications will be included in each of the blister cards 200. Specifically, the set schedule page 404 includes a prescription scheduling area 406. Although the prescription scheduling area 406 may include additional or fewer fields than depicted in FIG. 7, FIG. 7 depicts an embodiment in which the prescription scheduling area 406 includes a column 408 that lists the name 408A of the prescribed medication, which name 408A may also be a link that, upon activation, displays additional information about the prescribed medication. The prescription scheduling area 406 may also include a column 410 displaying the directions 410A (e.g., "Take 4 Times Daily") for taking the prescribed medication. The scheduling area 406 displays and receives information related to when (e.g., morning, noon, evening, and night) various doses of the medication will be scheduled (i.e., which dose cards 200 will include the medication). The scheduling area 406 may include multiple time-of-day columns 414-420, with each column representing a particular time of day and corresponding to one of the blister cards 200 that could be included in the medication compliance packaging. For example, the embodiment depicted in FIG. 7 includes a column 414 representing "Morning," a column 416 representing "Noon," a column 418 representing "Evening," and a column 420 representing "Night." If the customer takes medications at each of the four times indicated by the columns 414-420, the customer would receive four blister cards 200 (i.e., one for each time of day at which the customer takes medication). Similarly, if a customer has only two medications, one of which is taken in the morning and the other of which is taken in the morning and the evening, the customer would receive two blister cards 200 (i.e., one for the morning and one for the evening). In some instances, the number or size of the medications scheduled for a particular time of day may require that the customer receive more than one blister card 200 for the time of day (e.g., if all of the medications scheduled for "Morning" do not fit within a single blister 208, the medications scheduled for "Morning" may be split between two blister cards 200).

Each of the time-of-day columns 414-420 may also include a time-of-day icon 428 and a time-of-day label 422, in addition to indications 424 and 426 of how what doses will be taken at what times. In some instances, the directions 410 corresponding to a particular medication 408 will specify the times of day at which the customer should take the medication (e.g., "Take Twice Daily at Morning and Night"). In these instances, the indicator 424 will be a fixed value as depicted with respect to Medications A and B in FIG. 7. In other instances, the directions 410 corresponding to a particular medication 408 will not specify specific times of day at which the customer should take the medication (e.g., "Take Once Daily"). In these instances, the indicator 426 will be a text box, a check box, or a pull-down box, such as that depicted with respect to Medication C in FIG. 7, that allows the customer to select the time or times at which the medication will be scheduled and, therefore, which dose cards 200 will include the medication. Moreover, in some embodiments, the customer may edit the time-of-day labels 422 to indicate other times of day or other labels for a particular time of day (e.g., "Breakfast," "Lunch," "Dinner," and "Bedtime;" "9 AM," "12 PM," and "6 PM;" or "Desayuno," "Almuerzo," "Cena," and "Dormir"). In yet another embodiment, the customer may select the time-of-day icons 428 from a number of possible time-of-day icons (not shown).

After reviewing and/or selecting the time or times of day for which each medication is scheduled, and making any desired changes to the time-of-day labels 422 and/or the time-of-day icons 428, the customer may select the "Save & Continue" button 368 to save the information on the set schedule page 404 and cause the user-interface application 111 to navigate to the next step in the enrollment process. Alternatively, the customer may activate a "Go Back" button 430 to discard the information on the set schedule page 404 and cause the user-interface application 111 to navigate back to the prescription selection page 344. Of course, the "Go Back" button 430 need not necessarily discard the information and, instead, may save the information and go back the previous screen (in this case the prescription selection page 344). In one embodiment, the "Go Back" button 430 is labeled "Go Back," while in another embodiment, the "Go Back" button 430 is labeled "Return to Previous Screen" and in still another embodiment the "Go Back" button 430 is labeled "Return to Choose Prescriptions." Those of skill in the art will recognize that the button may have any label that indicates its function (i.e., returning to the previous screen). Of course, the customer may also select the "Cancel Order" button 334 to cancel the enrollment process, or may select the "Save for Later" button 366 to save the information in the prescription scheduling area 406 and complete the enrollment process at a later time. Like the pages previously described, the set schedule page 404 may also include page-specific instructions 432, the logo 314, the contact information 342, the patient name 336, the "Home" link 338, the "Help" link 318, the "Logout" link 340, the navigation bar 374, and the "Frequently Asked Questions" box 370.

FIG. 7 also illustrates a "Show Me" link 434 and an icon 435. Activation of the "Show Me" link 434, which may also be accomplished by clicking on the icon 435, causes the user-interface application 111 to display a helpful tutorial to the user. The tutorial may take the form of a flash animation accompanied by text and/or audio, a video demonstration, a video description, etc., and generally demonstrates for the user or walks the user through completing the steps described in the instructions 432. Of course, the "Show Me" link 434 and the icon 435, while only depicted on the "Set Schedule" page 404, may be included on any user interface page in the enrollment system 100. As is apparent, activation of the link may cause the user-interface application 111 to display different tutorials depending on the page from which the link is activated. Moreover, the steps described or illustrated in the tutorial may be more of less elaborative than those described in the instructions 432 (or 372, 454, etc.). The "Show Me" link 434 may be included on any of the pages, or on none of the pages, and need not necessarily be labeled "Show Me."

Figure 8:
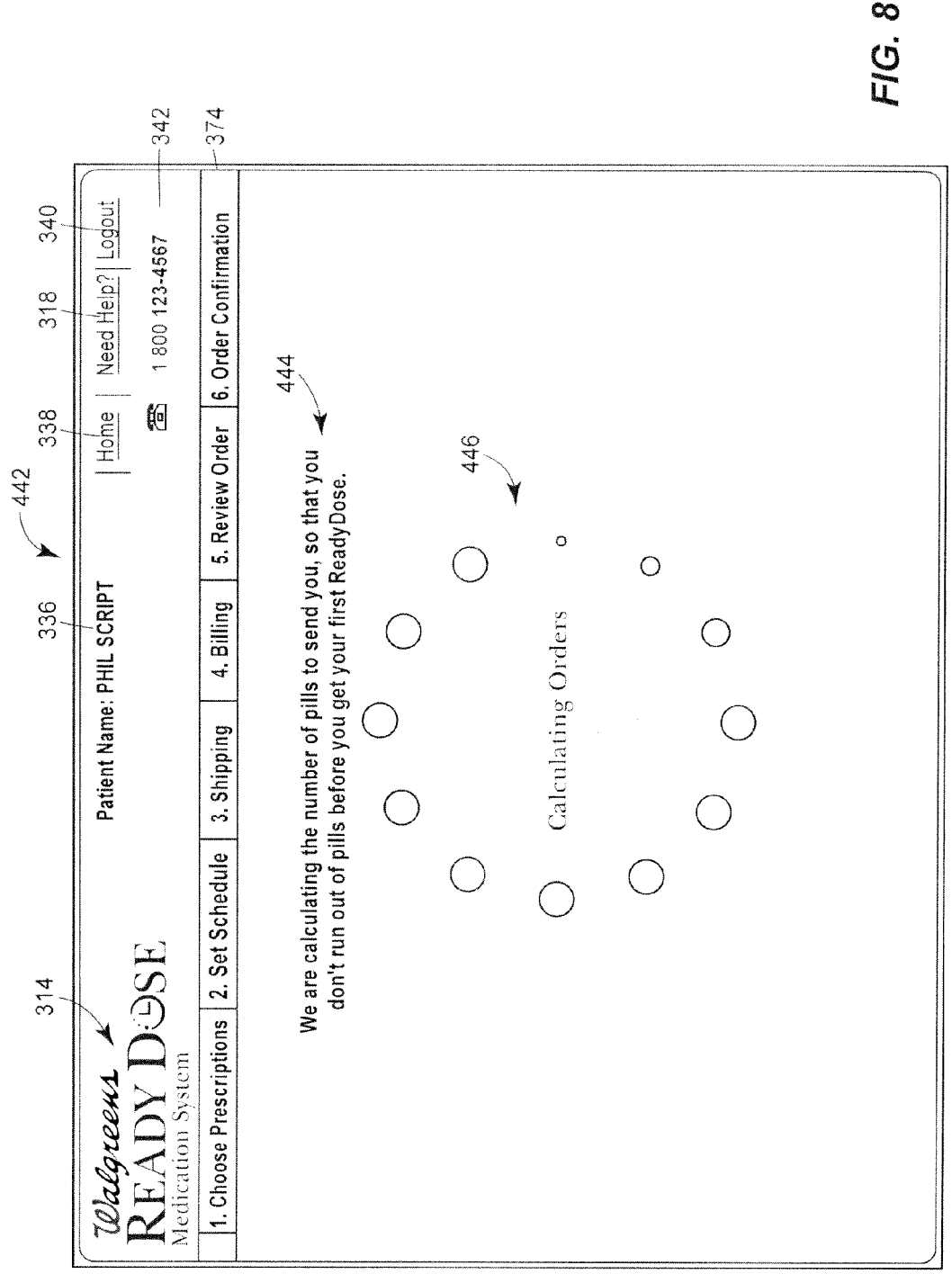
FIG. 8 is a screen shot of a user-interface page displayed while the exemplary medication compliance packaging enrollment system performs calculations.

When the customer selects the "Save & Continue" button 368 on the set schedule page 404, the user-interface application 111 navigates to a "Calculating Orders" page 442, such as that illustrated in FIG. 8. The enrollment system 100 displays the calculating orders page 442 at or near the time that the enrollment system 100 calculates a compliance packaging start date (the date on which the customer will nominally begin taking medication doses from the compliance package), the date the customer will receive the first compliance package (which should be on or before the compliance packaging start date), and any "Partial Orders" of medication (i.e., short fills, containing less than the full amount of prescribed medication) necessary to provide the customer with a sufficient quantity of a medication so that the customer does not exhaust the current supply of medication before receiving the compliance package. Put another way, the compliance packaging program requires that each of the medications included in the program have the same start date, and the provision of partial orders allows the system to align the prescription refill dates. Various methods for aligning the prescription refill dates for prescriptions included in the compliance packaging program are disclosed in application Ser. No. 12/276,053, entitled "METHOD AND SYSTEM FOR CALCULATING AN ALIGNMENT DATE FOR PRESCRIPTIONS," and filed on Nov. 21, 2008, and application Ser. No. 11/781,926, entitled "System and Method of Prescription Alignment," and filed on Jul. 23, 2007, both of which incorporated herein by reference above. The calculating orders page 442 may include a status or progress indicator 446, to indicate to the customer that the enrollment system 100 is performing tasks in the background, and may also include information 444, describing to the customer what the system is doing during the time the calculating orders page 442 is displayed. Of course, the "Calculating Orders" page 442 may be displayed for longer than required for the enrollment system 100 to perform the calculations. In one embodiment, for example, the enrollment system 100 performs the calculations before or after display 442 is to provide to the customer with the information on the page.

Figure 9:
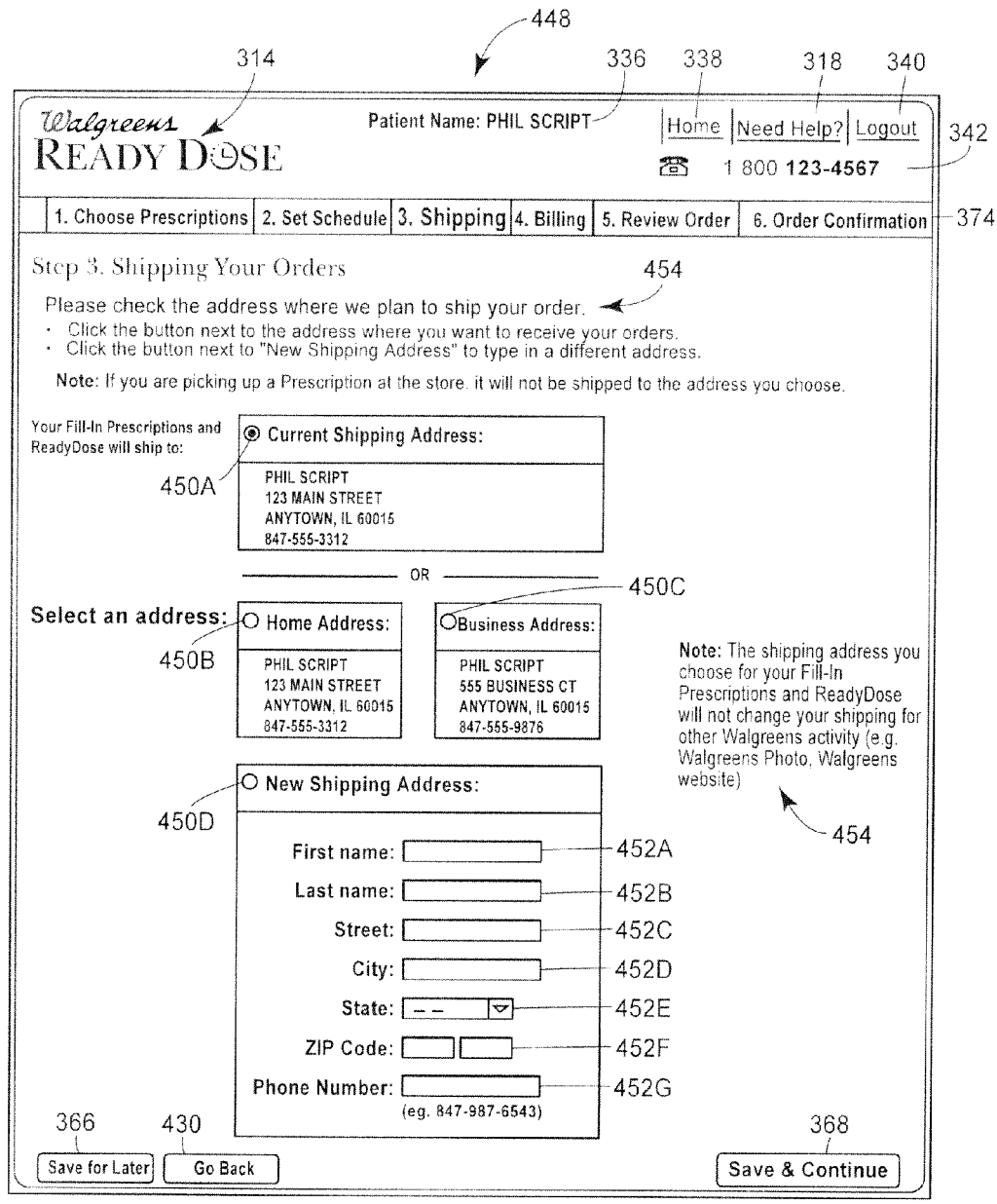
FIG. 9 is a screen shot of a user-interface page for selecting a shipping address using the exemplary medication compliance packaging enrollment system.

FIG. 9 illustrates a shipping page 448 displayed for the customer after the enrollment system 100 has completed the calculations that occur while the calculating orders page 442 is displayed. On the shipping page 448, the customer selects an address to which the medication compliance package, and any partial orders, will be shipped. The shipping page 448 may include one or more radio buttons 450 for selecting an address. For example, a radio button 450A may select a default or current address to which the compliance package will be shipped, a radio button 450B may select a "Home Address" associated with the customer's account, and a radio button 450C may select a "Business Address" associated with the customer's account. The shipping page 448 may also include a radio button 450D that allows the customer to select a "New Shipping Address," and data fields 452A-452G, that allow the customer to enter a new shipping address. The data fields 452A-452G may include, for example, a field 452A for a first name, a field 452B for a last name, a field 452C for a street address, a field 452D for a city name, a field 452E for a state name, a field 452F for a ZIP code, and a field 452G for a phone number. Each of the fields 450 and 452 may be any type of data entry field (e.g., text fields, pull-down boxes, etc.) in any combination that allows the customer to enter the required information. Instructions 454 may explain to the customer what information to enter on the shipping page 448, and may provide additional information (e.g., whether changing the address may affect other orders, whether changing the address may affect other services, etc.). Of course, the shipping page 448 may also include the logo 314, the contact information 342, the patient name 336, the "Home" link 338, the "Help" link 318, the "Logout" link 340, the navigation bar 374, the "Frequently Asked Questions" box 370, the "Save for Later" button 366, the "Go Back" button 430, and the "Save & Continue" button 368.

Figure 10:
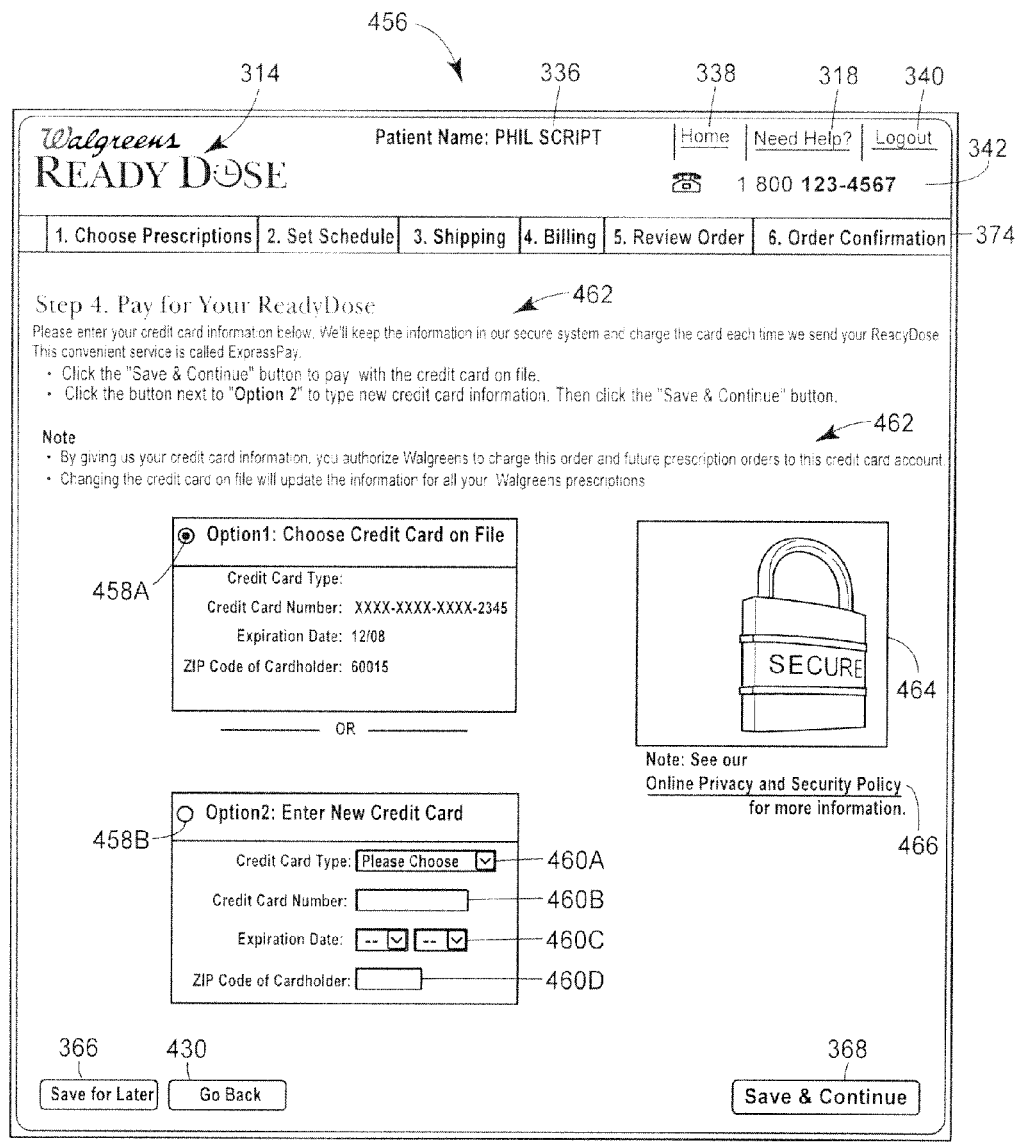
FIG. 10 is a screen shot of a user-interface page for selecting a payment method using the exemplary medication compliance packaging enrollment system.

If the customer selects the "Save & Continue" button 368 on the shipping page 448, the customer's selection of shipping address (including data in the fields 452A-452G specifying a new address, if button 450D is selected) is saved, and the user-interface application 111 navigates to a billing page 456. FIG. 10 illustrates one embodiment of the billing page 456. On the billing page 456, the customer selects a payment method for the medication compliance packaging service, and for the medications dispensed in the medication compliance package. The billing page 456 may include one or more radio buttons 458 for selecting one of various billing options. For example, a radio button 458A may select a default credit card already on file, while a radio button 458B selects "New Credit Card" and data fields 460A-460D allow the customer to enter new credit card information. The data fields 460A-460D may include, for example, a field 460A for a credit card type, a field 460B for a credit card number, a field 460C for an expiration date, and one or more fields 460D for verification information (e.g., a cardholder ZIP code, a card verification code, etc.) for the credit card. Of course, additional data fields (not shown) may allow the customer to input a billing address and/or other information. Each of the fields 460 may be any type of data entry field (e.g., text fields, pull-down boxes, etc.) in any combination that allows the customer to enter the required information. The billing page 456 may also include, in some embodiments, other radio buttons 458 that provide options for selecting other payment methods (e.g., direct debit, checking account, PayPal™, BillMeLater®, bill the customer, etc.) as well as any data entry fields necessary to collect information needed to implement the other payment methods. An indicator 464 may provide an assurance to the customer that the information entered on the page is secure, and a link 466 may provide additional details regarding the security measures and/or the company's privacy policy. Like the previous pages, the billing page 456 may also include instructions 462 for the page 456, the logo 314, the contact information 342, the patient name 336, the "Home" link 338, the "Help" link 318, the "Logout" link 340, the navigation bar 374, the "Frequently Asked Questions" box 370, the "Save for Later" button 366, the "Go Back" button 430, and the "Save & Continue" button 368.

Figure 11:
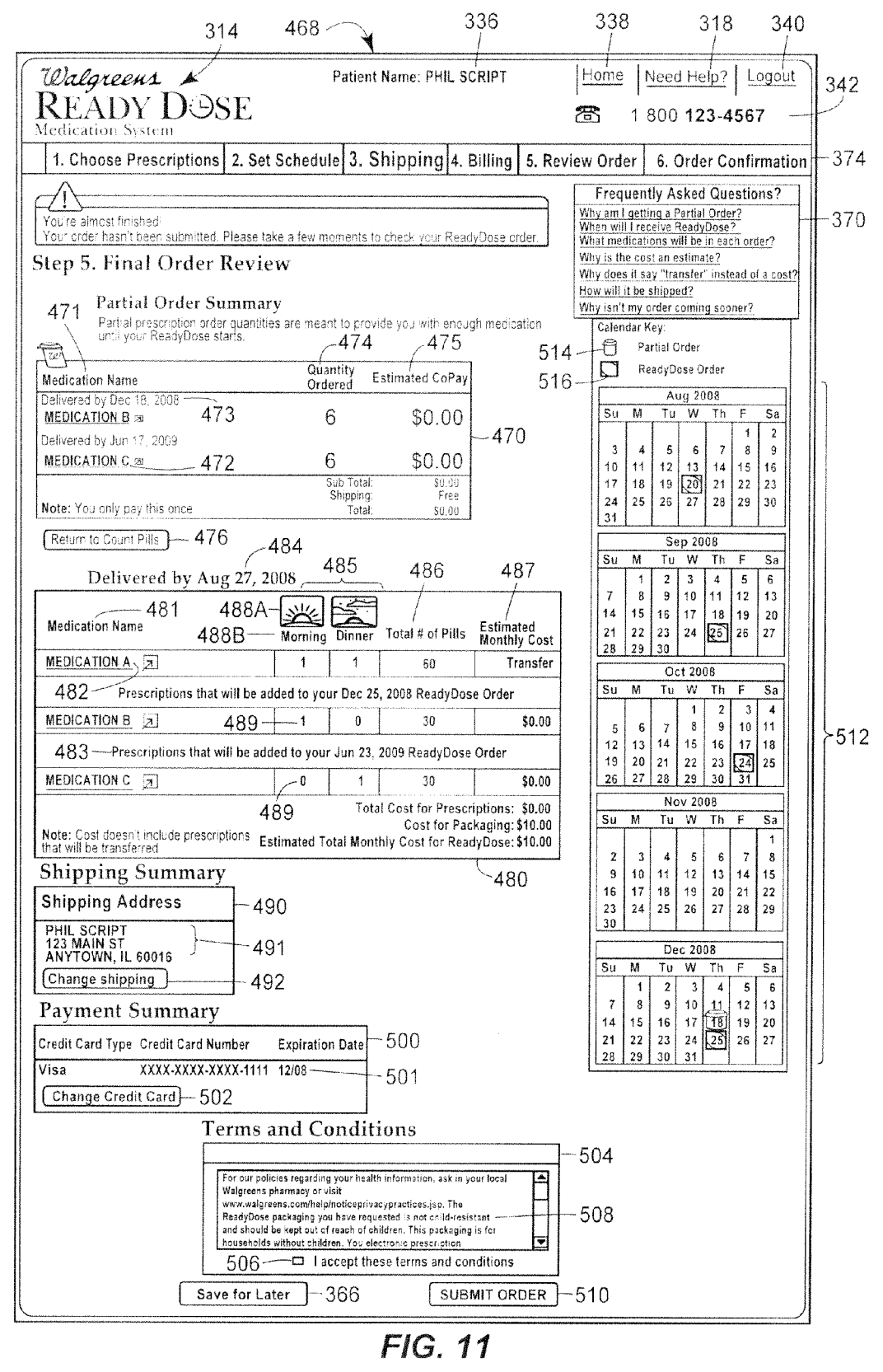

FIG. 11 illustrates an exemplary order review page 468. The order review page 468 is displayed by the user-interface application 111 after the customer selects the "Save & Continue" button 368 on the billing page 456. The order review page 468 includes an overview of all of the important information associated with the customer's medication compliance packaging order. The order review page 468 may include: a partial order summary 470, summarizing any partial orders necessary for the patient to have sufficient medication to last until the compliance packaging delivery date; a compliance packaging summary 480, summarizing the various details of the compliance packaging; a shipping summary 490; and a payment summary 500.

The partial order summary 470 may include a list 471 of medications for which partial orders are required. The list 471 may include the name 472 of each medication for which a partial order is scheduled. As described above with reference to the prescription selection page 344, the name 472 of each prescription medication may be a link that, when activated, causes the user-interface 111 to display additional information about the medication. The list 471 may also include, for each listed medication, a date 473 by which the partial order of the medication will be delivered to the customer. A column 474 in the list 471 may display the quantity of each listed medication that the partial order will include, while a column 475 may display a calculated or estimated cost to the patient for each partial order.

The compliance packaging summary 480 may include a list 481 of medications that will be included in the medication compliance packaging delivered to the customer. The list 481 may include the name 482 of each medication that the medication compliance packaging will include. Once again, the name 482 of each included medication may be a link that, upon activation, causes the user-interface 111 to display additional information about the medication. Each of the listed medications may also include an indication 483 as to the date on which the medication 482 will be added to the compliance packaging. The compliance packaging summary 480 may also include an indication 484 of the date on which the customer can expect to receive the first compliance package. In addition, the compliance packaging summary 480 may include a dose schedule summary 485 for each of the medications included in the compliance package, a column 486 indicating for each medication how many pills the compliance package will include, and a column 487 indicating for each medication the monthly cost of the medication. The dose schedule summary 485 may include, for each scheduled time, an icon 488A and a corresponding label 488B indicative of the scheduled time. The medication compliance package will include one or more blister cards 200 for each scheduled time. For example, the exemplary compliance packaging summary 480 illustrated in FIG. 11 depicts two icons 488A above corresponding labels 488B ("Morning" and "Dinner"). Thus, the compliance packaging summary 480 depicted in FIG. 11 shows that the customer would receive two blister cards 200 (i.e., one for "Morning" and one for "Dinner"). For each medication, a number 489 under the corresponding icon (or icons) 488A and label (or labels) 488B will indicate how many pills will be included in each blister 208 of the blister card 200.

The shipping summary 490 displays the selected shipping address 491. If the customer, while reviewing the shipping summary 490 decides to change the selected shipping address 491, the customer may select a "Change Shipping" button 492. Activation of the "Change Shipping" button 492 may cause the user-interface application 111 to display the shipping page 448, or may cause the user-interface application 111 to display an alternate page (not shown) to allow the customer to alter the selected shipping address.

In a like manner, the payment summary 500 displays the selected payment method and information 501. If the customer decides, after reviewing the payment summary 500, that the information is incorrect or that the customer wants to select an alternate payment method, the customer may activate a "Change Payment Method" button 502. Activation of the "Change Payment Method" button 502 may cause the user-interface application 111 to display the billing page 456, or may cause the user-interface application 111 to display an alternate page (not shown) to allow the customer to alter the selected payment method.

The order review page 468 may also include a "Terms and Conditions" section 504. The "Terms and Conditions" section 504 outlines the terms and conditions to which the customer must agree before enrollment in the medication compliance packaging program will be complete. The "Terms and Conditions" section 504 may include a window 508 that includes the terms of the agreement. The length of the agreement may, of course, necessitate that the window 508 be scrollable (i.e., that the window provide a mechanism for the customer to scroll through the terms and conditions to view them in their entirety). Alternatively, the full content of the "Terms and Conditions" section 504 may be displayed by a link (not shown) that activates a pop-up window (not shown) or navigates to a new window. A check box 506, or other control as generally known, may allow the customer to indicate his or her acceptance of the terms and conditions presented in the window 508.

In some embodiments, the order review page 468 may also include an order summary calendar 512. The order summary calendar 512 may depict, using icons 514 and 516, respectively, the delivery dates of the various partial orders and medication compliance package orders. For example, the order summary calendar 512 illustrated in FIG. 11 shows compliance packaging deliveries occurring on August 27, September 25, October 24, November 25, and December 25, and shows a partial order delivery occurring on December 18.

Like the various other pages described above, the order review page 468 may also include the logo 314, the contact information 342, the patient name 336, the "Home" link 338, the "Help" link 318, the "Logout" link 340, the navigation bar 374, the "Frequently Asked Questions" box 370, and the "Save for Later" button 366. Additionally, the order review page 468 also includes a "Submit Order" button 510. Activation of the "Submit Order" button 510 causes the enrollment system 100 to process the order, and causes the user-interface application 111 to display an order confirmation page 544. The "Submit Order" button 510 may optionally be deactivated until the customer selects the check box 506 to indicate that the customer agrees to the terms and conditions presented in the window 508.

Figure 12:
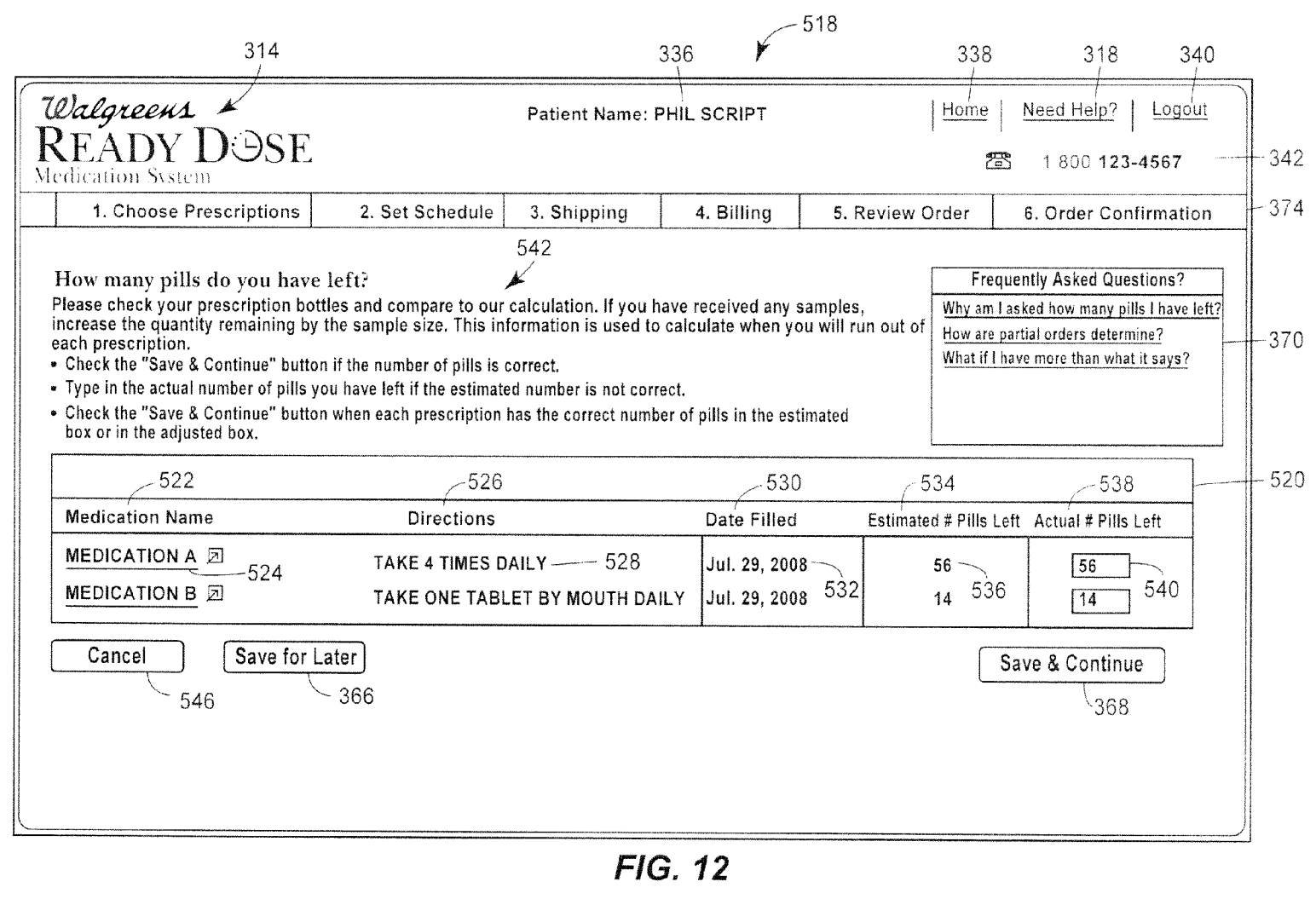

In some embodiments, the order review page 468 also includes a button 476 that provides an opportunity for the customer to tell the enrollment system 100 how many pills of each medication the customer has remaining. Activation of the button 476 causes the user-interface application 111 to display a page 518 that allows the customer to revise the number of pills remaining for each of the selected medications. FIG. 12 illustrates one embodiment of the page 518. A section 520 of the page 518 displays relevant information in a number of columns 522, 526, 530, 534, and 538. The section 520 includes the column 522 that lists the names 524 of each medication. Each medication name 524 may also be a link, the activation of which causes the user-interface application 111 to display additional information about (and possibly images of) the medication. The column 526 lists the medication directions 528 associated with each listed medication. The column 530 lists, for each medication, the date 532 on which the corresponding prescription was last filled. The column 534 lists, for each medication, the estimated number 536 of pills remaining. The number 536 may be calculated from the date 532 on which the corresponding prescription was last filled, or may be calculated by some equivalent method. Lastly, the column 538 includes text boxes 540 for allowing the customer to enter, for each listed medication, the actual number of pills remaining. Of course, the text boxes 540 may also be pull-down boxes or any other type of field that allows the user to enter the information. In addition to a "Cancel" button 546 for allowing the customer to return to the order review page 468 without making changes, the page 518 may also include instructions 542 for the page 518, the logo 314, the contact information 342, the patient name 336, the "Home" link 338, the "Help" link 318, the "Logout" link 340, the navigation bar 374, the "Frequently Asked Questions" box 370, the "Save for Later" button 366, and the "Save & Continue" button 368.

If the customer activates the "Save & Continue" button 368 on the page 518 after making changes to the fields 540, the enrollment system 100 will save the data entered into the fields 540, recalculate the number of pills included in the various partial orders, and may also change the date that the first medication compliance package will be received by the customer. The user-interface application 111 may again display the "Calculating Orders" page 442 (e.g., if changes were made on the page 518) and/or may return to displaying the order review page 468, which will reflect any changes (e.g., to partial order quantities, compliance package delivery dates, etc.) that result from the changes to the fields 540.

Figure 13:
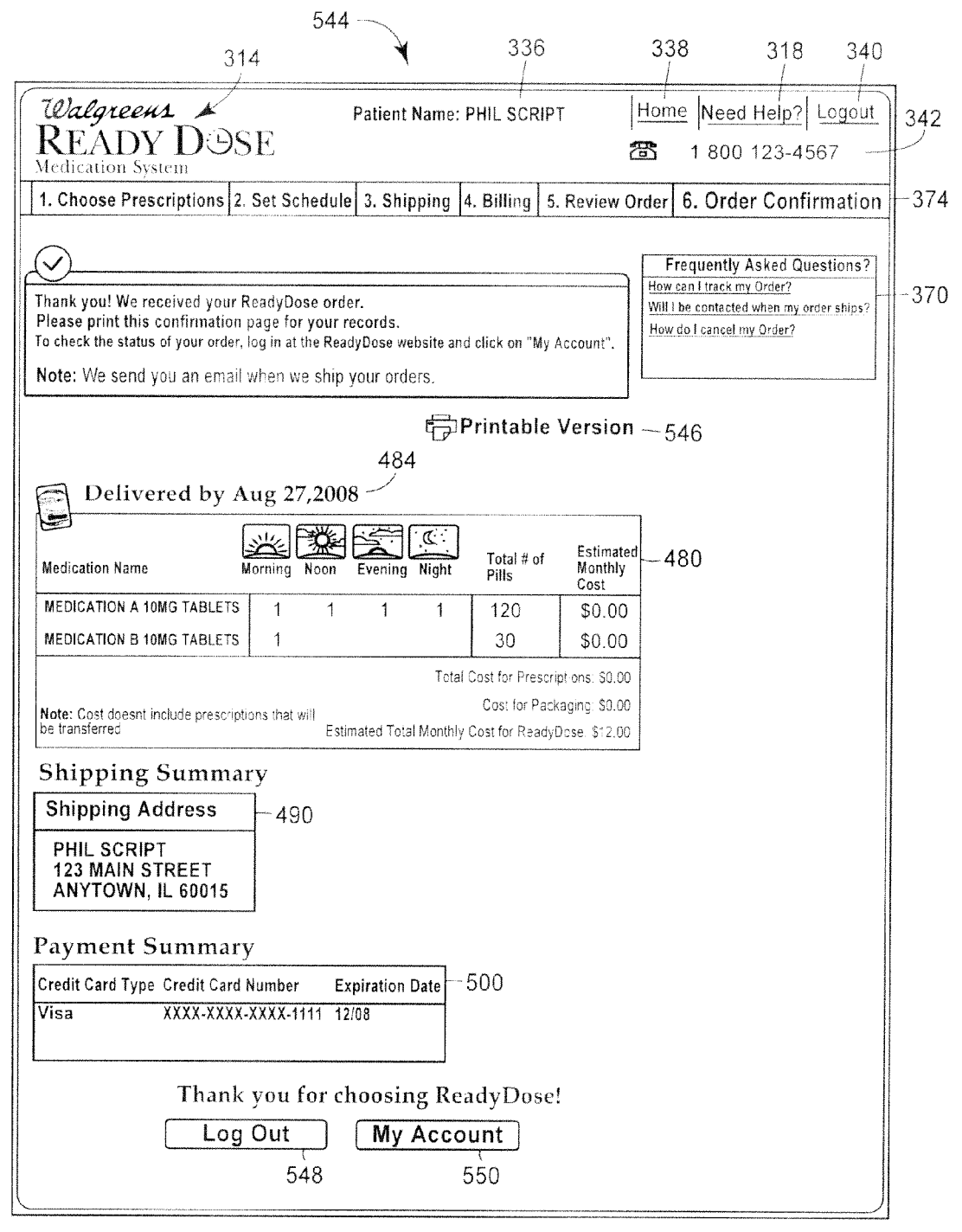

As previously described, if the customer selects the "Submit Order" button 510 on the order review page 468 (after selecting the check box 506 to indicate acceptance of the terms and conditions), the enrollment system 100 stores the information associated with the compliance packaging order and the order is complete. Activation of the "Submit Order" button 510 also causes the user-interface application 111 to display the order confirmation page 544, illustrated in FIG. 13. The order confirmation page 544 includes any of the order information displayed on the order review page 468, such as the compliance packaging summary 480, the indication 484 of the date on which the customer should expect delivery of the first compliance package, the shipping summary 490, and the payment summary 500. Of course, the exact information displayed on the order confirmation page 544 is discretionary and additional, less, or different information may be displayed, according to the preferences of the designer of the enrollment system 100. In addition to the logo 314, the contact information 342, the patient name 336, the "Home" link 338, the "Help" link 318, the "Logout" link 340, the "Frequently Asked Questions" box 370, and the navigation bar 374, the order review page 468 may also include a link 546 that causes the user-interface application 111 to display a printable version of the order summary page 544, a "Log Out" button 548 that will log the user out of the enrollment system 100, and a "My Account" button 550 that takes the customer to an account information page (described below with reference to FIG. 14).

Figure 14:
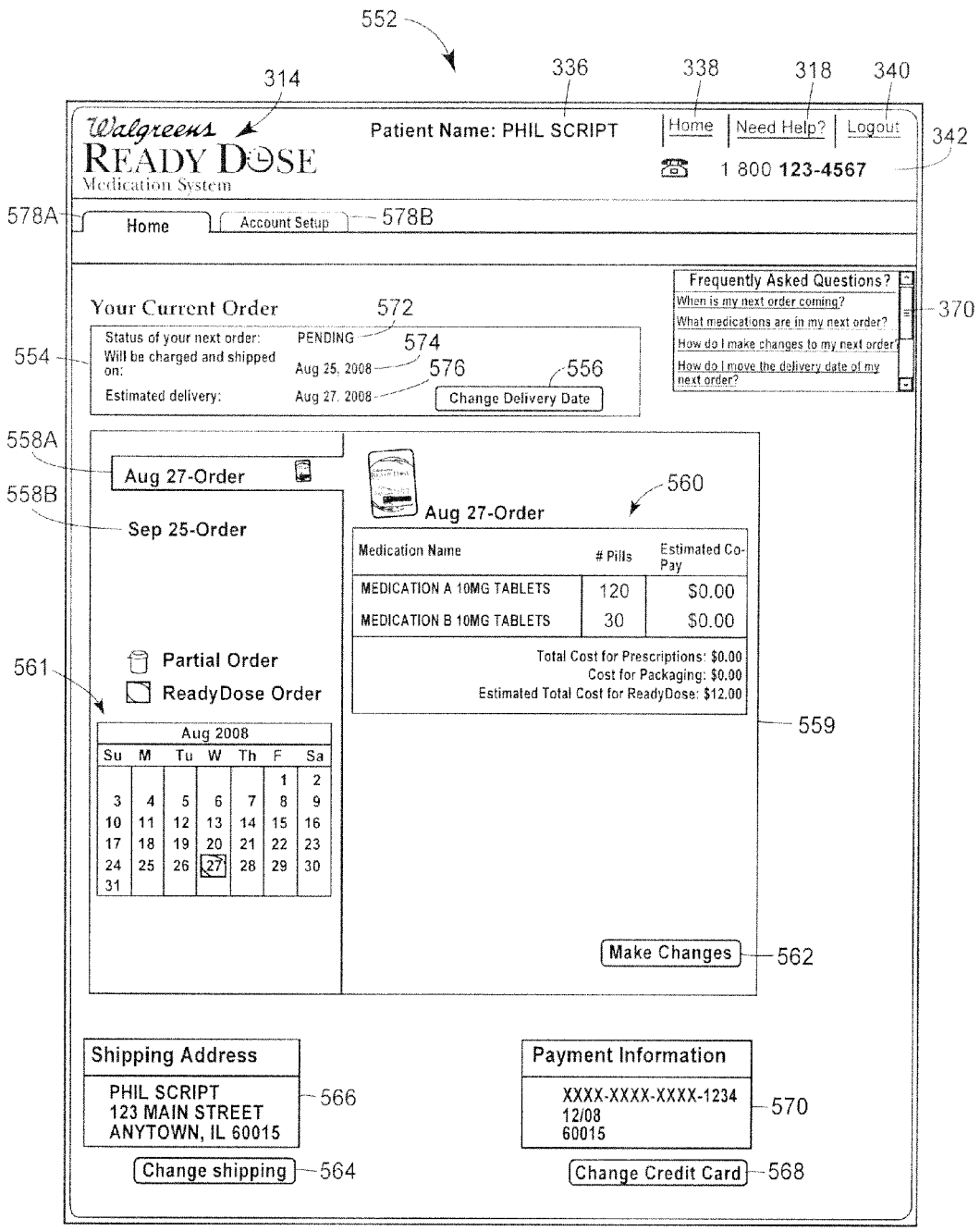
FIG. 14 is a screen shot of a user-interface page for viewing customer and order information using the exemplary medication compliance packaging enrollment system.

Activation of the "My Account" button 550 on the order confirmation page 544 may cause the user-interface application 111 to display an account information page 552 that displays the customer's account information. One embodiment of such a page is illustrated in FIG. 14. The account information page 552 may display various information related to the medication compliance packaging program parameters associated with the customer. For example, the account information page 552 may include information 554 about the customer's next order, such as a status 572 of the next order, a date 574 on which the next order will be charged to the customer and shipped to the selected shipping address, and an estimated date 576 on which the next order will be delivered to the customer. A "Change Delivery Date" button 556 may allow the customer to change the delivery date (which may also cause the enrollment system 100 to adjust various other parameters of the order, including partial order quantities and dates). Activation of the "Change Delivery Date" button 556 may, for example, activate a pop-up calendar (not shown) that allows a customer to select a new delivery date or, alternatively, may cause the user-interface 111 to navigate to a new window (not shown) that allows the customer to select a new delivery date.

The account information page 552 may also include an order information area 559. The order information area 559 may display a list of scheduled orders 558, which may include compliance package orders and partial orders. Selecting one of the scheduled orders 558, such as the compliance packaging order 558A in FIG. 14, highlights the order, and displays the details 560 for the order. This may include displaying a calendar 561 that shows an indication of the date on which the displayed order is scheduled for delivery. A "Make Changes" button 562 may allow the customer to make various changes to the order by, for example, causing the user-interface application 111 to return the customer to the order review page 468. Selecting a second of the scheduled orders 558, such as the partial order 558B in FIG. 14, highlights the order and displays information about the order. The order information area 559 may include any number of scheduled orders 558 (including partial orders).

A shipping summary 566 and a payment summary 570 may also be included in the account information page 552, displaying the current shipping address and the current billing information, respectively. A "Change Shipping" button 564 and a "Change Billing" button 568 may allow the customer to edit the default shipping address and billing information, respectively.

Figure 15:
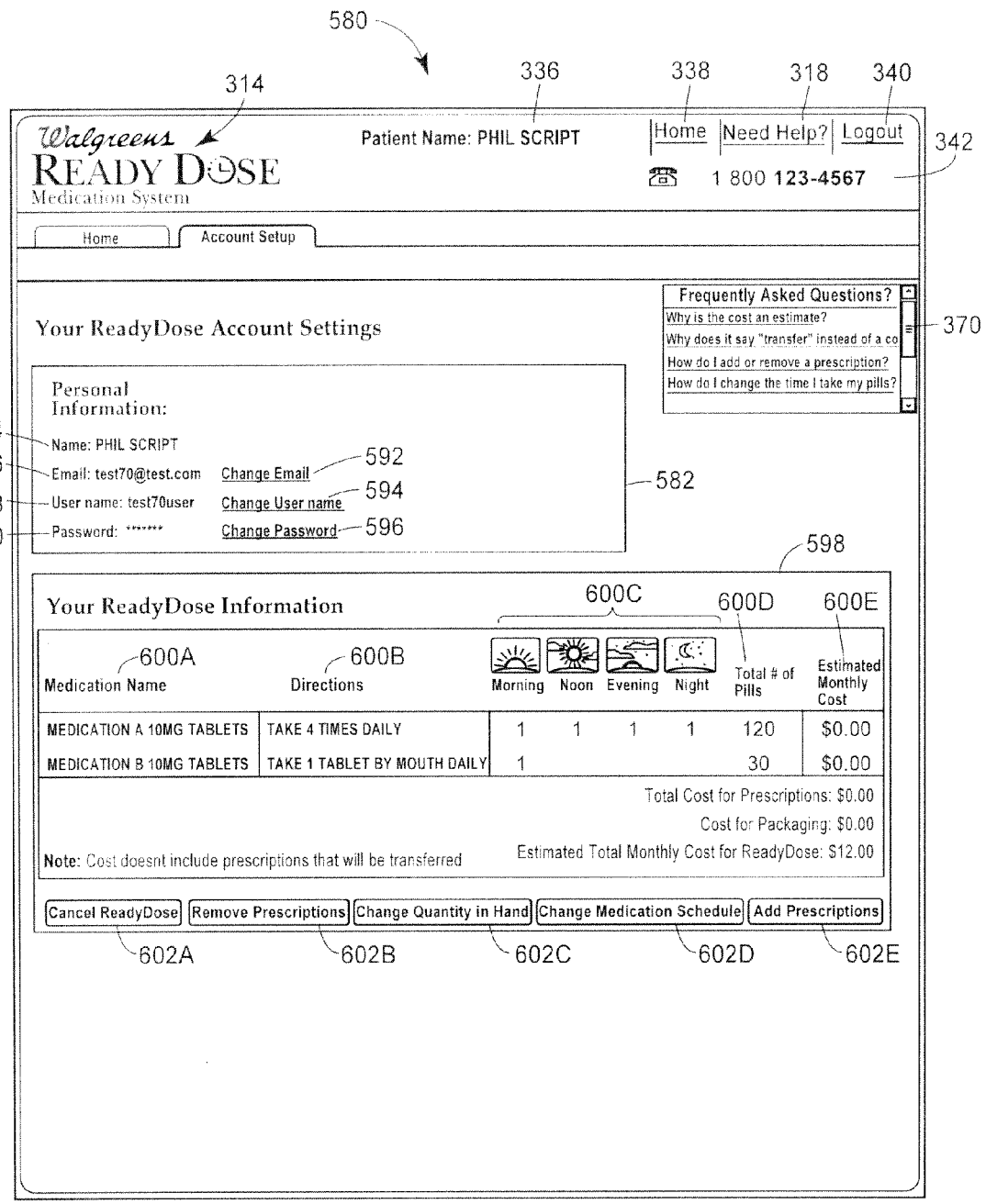
FIG. 15 is a screen shot of a user-interface page for modifying account information using the exemplary medication compliance packaging enrollment system.

The account information page 552 may also have two or more navigation tabs 578. A "Home" tab 578A may display the "Account Information" page 552. In some embodiments, the "Home" link 338 included on one or more of the various pages displayed by the user-interface application 111 also causes the user-interface application 111 to display the account information page 552. The account information page 552 may also include an "Account Setup" tab 578B. Activation of the "Account Setup" tab 578B causes the user-interface application 111 to display an account setup page 580, such as the account setup page 580 illustrated in FIG. 15.

The account setup page 580 may include a personal information section 582. The personal information section 582 can include information such as the customer name 584, an email address 586 for the customer, a user name 588 for the customer, and a password 590 for the customer. A link or button next to each of the email address, the username, and the password may allow the customer to edit the corresponding information. For example, activation of a link 592 may cause the user-interface application 111 to display a dialog box or page (not shown) that allows the customer to enter a new email address to associate with the account. Likewise, activation of a link 594 may cause the user-interface application 111 to display a dialog box or page (not shown) that allows the user to enter a new username to use when logging into the account. Similarly, activation of a link 596 may cause the user-interface application 111 to display a dialog box or page (not shown) that allows the user to enter a new password to use when logging into the account.

The account setup page 580 may also include a compliance packaging information section 598. The compliance packaging information section 598 may include the medication name 600A, the directions 600B, the schedule 600C, the total number of pills 600D, and the estimated monthly cost 600E for each of the mediations selected to be part of the medication compliance packaging program. In addition to the various information 600 displayed in the compliance packaging information section 598, various buttons 602 may allow the customer to modify the parameters of the medication compliance packaging program enrollment. For example, activation of a button 602A may allow the customer to cancel the enrollment in the medication compliance packaging program. Activation of buttons 602E and 602B may allow the customer to add or remove prescriptions, respectively, from the medication compliance packaging program by, for example, causing the user-interface application 111 to display the prescription selection page 344. Alternatively, activation of the buttons 602E and/or 602B may cause the user-interface application 111 to display separate screens (not shown) for adding to or removing from, respectively, the selected medications. Of course, the screens for adding medications to or removing medications from the selected medications may each display a list of currently selected medications, may display a list of medications eligible but not selected, may display a confirmation window or dialog box or pop-up window asking the user to confirm the addition or removal of a medication, etc. Activation of a button 602C may allow the customer to change the indication of the quantity of medication remaining in the customer's supply by, for example, causing the user-interface application 111 to display the page 518. Lastly, activation of a button 602D may allow the customer to change the medication schedule by causing the user-interface application 111 to display the set schedule page 404.

In one embodiment, the enrollment system 100 evaluates whether or not each scheduled partial order of a medication will be delivered to the customer before the customer exhausts his or her supply of the particular medication. For example, the system 100 may make the evaluation after receiving the shipping information entered on the shipping page 448. If the scheduled partial order of the medication will not be delivered to the customer before the customer exhausts the supply of medication, the enrollment system 100 may cause the user-interface application 111 to display a delivery question page 604. FIG. 16 illustrates one embodiment of the delivery question page 604. The delivery question page 604 displays a message 606 to the customer to inform the customer that they will run out of the particular medication before receiving the partial order (or the compliance packaging order), and recommends to the customer that the partial order (or the compliance packaging order) be picked up at a local pharmacy 112 within the retail network 110. A button 608 allows the customer to elect to pick up the order at the local pharmacy 112. A button 610 allows the customer to elect to have the partial order shipped, even though it means the customer may miss one or more doses of the medication.

Figure 17:
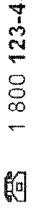
FIG. 17 is a screen shot of a user-interface page for displaying pharmacy pick-up information using the exemplary medication compliance packaging enrollment system.

FIG. 17 illustrates a pharmacy pick-up page 612 displayed by the user-interface application 111 in the event that the customer activates the button 608. The pharmacy pick-up page 612 displays the medication or medications 613 that are scheduled to be picked up by the customer. The page 612 also displays the time and date 614 at which the medication(s) will be ready to be picked up, the pharmacy 618 at which the prescriptions will be ready for the customer to pick up, and the pharmacy hours 619 of that pharmacy. If the customer would prefer to pick up the medication(s) at a different time and/or on a different date, the customer may activate a "Change Pick-up Time" button 616. Likewise, if the customer would prefer to pick up the medication(s) at a different store, the customer may activate a "Change Pick-up Store" button 620. A "Go Back" or "Return to Delivery Question" button 622 causes the user-interface application 111 to discard any changes and return the customer to delivery question page 604. However, if the customer activates the "Save & Continue" button 624, the information is saved and the user-interface application 111 returns the customer to the enrollment process.

Figure 18:
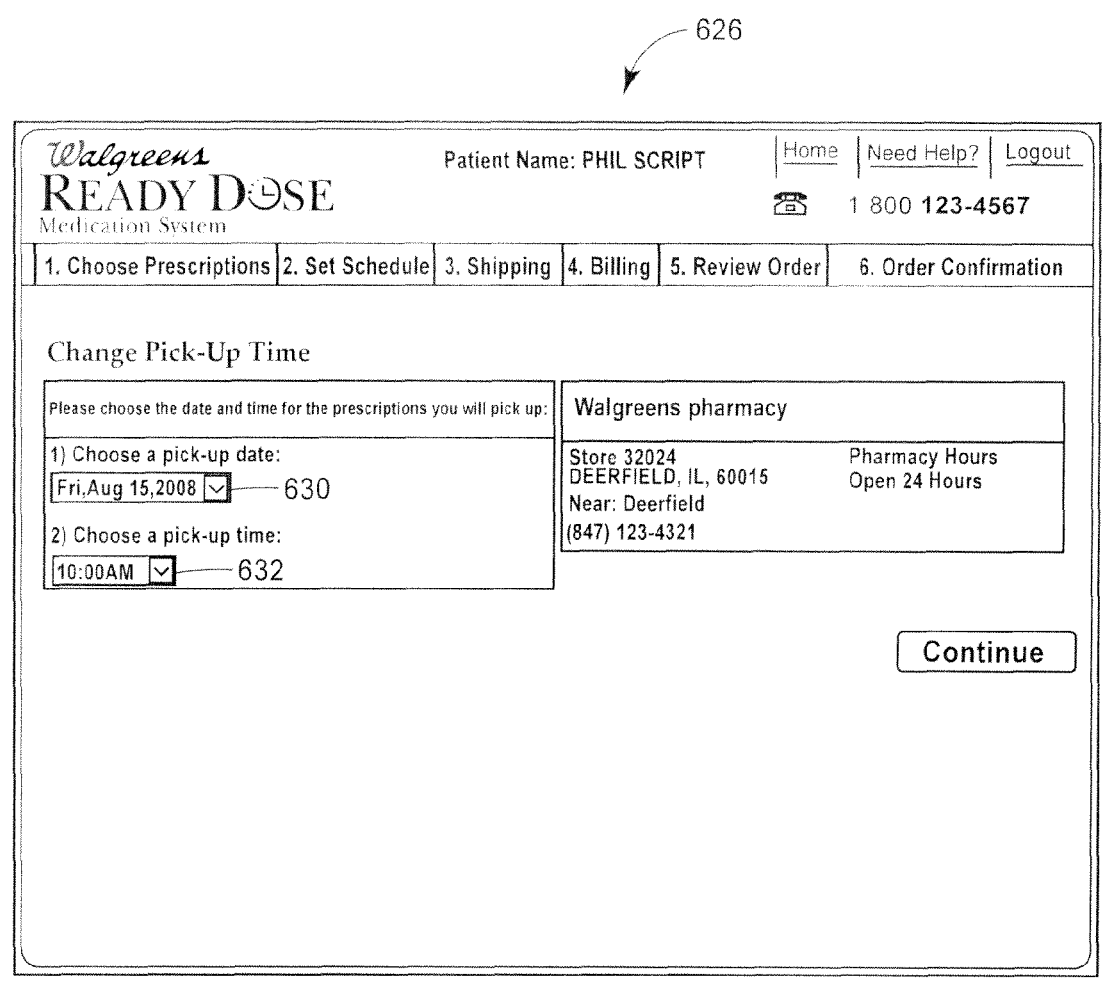
Figure 19:
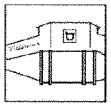
FIG. 19 is a screen shot of a user-interface page for searching for and selecting a pharmacy using the exemplary medication compliance packaging enrollment system.

FIGS. 18 and 19 depict exemplary pages 626 and 628, displayed upon activation of the buttons 616 and 620, respectively, on page 612. The page 626 includes controls 630 and 632 that respectively allow the customer to select a different date and/or a different time at which to pick up the medication from the pharmacy. While the controls 630 and 632 are depicted in FIG. 18 as pull-down boxes, other embodiments may employ other control types (e.g., a calendar for control 630 and a clock for control 632). The page 628 includes a search mechanism 634 that allows the customer to search for a particular pharmacy based on, by way of example and not limitation, an address, a city and state, or a ZIP code. Additional parameters may be available to narrow the search results such as, for example, the hours of the pharmacy and whether the pharmacy has a drive-through window.

As described above, a customer enrolling in the medication compliance packaging program may have access to different pages than a customer service representative enrolling a customer in the program, or may have access to only a sub-set of pages available to a customer service representative enrolling a customer in the program. For example, when a customer service representative signs on to the enrollment system 100, the representative may be presented with a search page 636, such as the search page 636 illustrated in FIG. 20. The search page 636 allows the customer service representative, when assisting a customer, to search for the customer's information by entering various data into search criteria fields 638. For example, the representative may search by entering data into one or more fields 638 including: a last name field 638A, a first name field 638B, a phone number field 638C, a date-of-birth field 638D, an order number field 638E, or an order shipping date field 638F. Of course, the more information entered prior to searching, the more narrow the search results. After entering data into one or more search criteria fields 638, the customer service representative may activate a "Search" button 640 to search for customer entries that match the data entered into the search criteria fields 638. The customer entries may, for example, be stored in, and retrieved from, the database 146 or the database 182. A "Clear Fields" button 642 clears any data entered into the search criteria fields 638.

The search page 636 illustrated in FIG. 20 depicts a set of search results 644 returned by the enrollment system 100 in response to a search for customer accounts with order shipping dates matching "07/06/2008." That is, the enrollment system 100 returned the search results 644 in response to entry of "07/06/2008" in the order shipping date field 638F. The search results 644 may include a customer name 646, a customer phone number 648, a customer date of birth 650, a customer address 652, a customer order number 654, a customer order shipping date 658, and an available action 660. For each record returned in the search results 644, the available action 660 may be based on the current status of the customer's account. For example, the search result 644 for a customer who has not yet started the enrollment process may include a "Sign Up" button 662, while the search result 644 for a customer who has started, but not completed, the enrollment process may have a "Setup Alignment" button 666. Search results for customers who have already completed the enrollment process may have an "Account Details" button 664. Each of the buttons 662, 664, and 666 may cause the user-interface application 111 to display to the customer service representative a page appropriate to the customer's progress through the enrollment process. For example, activation of the "Sign Up" button 662 may cause the user-interface application 111, displayed to the customer service representative, to display the Account Validation page 320, while activation of the "Setup Alignment" button 666 may cause the user-interface application 111 to display the page for the next uncompleted step in the enrollment process (e.g., if the customer completed the prescription selection page 344 and then activated the "Save for Later" button 366, the user-interface application 111 may display the set schedule page 404), or a default page (e.g., prescription selection page 344). Activation of the "Account Details" button 664, meanwhile, may cause the user-interface application 111 to display the account information page 552.

The embodiments described above are not all-inclusive of the possible embodiments of the enrollment system 100. For example, various of the screens displayed by the user-interface 111 may, at various times, also include messages to the viewer indicating the success or failure of the previous operation (e.g., "Your change was successful," "The shipping address you entered has been saved," "We were not able to successfully save your shipping address because you did not enter a valid ZIP code," etc.), or indicating various errors. Moreover, the various screens displayed by the user-interface 111 need not be displayed in the order described in the embodiments above. For example, in one embodiment, billing information may be entered on the page 456 before shipping information is entered on the page 448. Further, the various components of the user-interface (i.e., the various pages) may include features that enable the page to be viewed or otherwise accessed by a person having a disability. Such features may include, without limitation, text equivalents for non-text elements; equivalent alternatives for multimedia features; non-color conveyances for information conveyed, by default, by color; redundant text links for links accessible by image map; row and column headers for data tables; a text-only alternative to the page with equivalent information and/or functionality; etc. Further still, additional pages, not described herein, may also be displayed by the user-interface 111, including: "landing pages" (that is, pages displayed to a user upon initially accessing the user-interface 111 via, for example, a web page) that may display flash animation or video demonstrations of the compliance packaging program; customer feedback pages; pages displaying ineligible prescription(s) and reasons; prescription addition and/or removal pages; various confirmation pages (e.g., confirming the removal of a prescription from the compliance packaging program); pages for selecting dates (e.g., delivery dates); order history pages, pages for modifying or updating various compliance packaging parameters after a customer has enrolled in the program, etc.

In some embodiments, the enrollment system 100 includes one or more additional software modules (not shown) that allow a pharmacist (or other personnel associated with the pharmacy) to print (or otherwise create) the personalized blister cards 200 after a customer has enrolled in the medication compliance packaging program. In other embodiments, the enrollment system 100 provides an interface to a separate system (not shown) for printing (or otherwise creating) the personalized blister cards 200. Also, in some embodiments the enrollment system 100 includes one or more additional software modules (not shown) that control a process or system for dispensing medication into the blisters 208 of the blister cards 200 (or any other compliance package used in the system). In other embodiments, the enrollment system 100 provides an interface to a separate system (not shown) for dispensing medication into the blisters 208 of the blister cards 200 (or other compliance package).

Moreover, embodiments are envisioned in which no partial orders are contemplated. For example, the enrollment system 100 may direct that the pharmacist/warehouse/etc. send out a compliance package upon enrollment, without regard for whether or not the customer will be out of any particular medication upon receiving the compliance package. That is, a customer having two medications may receive a compliance package even though she has a two-week supply of one medication remaining and a three-week supply of the other medication remaining. Put yet another way, a compliance package may be provided to the customer without first trying to align the prescriptions so that they otherwise would require refills on the same day. Further still, in an embodiment without partial orders, the compliance packaging program start date may be determined on the means used to provide the compliance package to the customer (i.e., a shipping company such as UPS or FedEx, postal service, etc.). If the enrollment system 100 determines that, using one means (e.g., shipping) to provide the compliance package to the customer will result in the customer exhausting her supply of a medication before receiving the compliance package, the enrollment system 100 may evaluate an alternate means for providing the compliance package to the customer. For example, the enrollment system 100 may determine that the customer could pick up the compliance package from a local pharmacy store instead of waiting for the compliance package to be delivered by a shipping company. Of course, selection of an alternate means for providing the compliance package to the customer may result in a new program start date.

Although the preceding text sets forth a detailed description of numerous embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the following claims.

What is claimed:

1. A method for enrolling a customer in a medication compliance packaging program, the method comprising:
   causing a processor to retrieve from a database a customer record indicating a plurality of prescriptions associated with the customer record, each prescription for a medication;
   receiving, via a user interface operating on a workstation, a selection of a set of prescriptions associated with the customer record;
   causing the processor to automatically select one or more dose times for each medication for which the corresponding prescription specifically indicates a prescribed dose time for the medication;
   receiving, via the user interface, at least one customizable parameter of a medication compliance package, the at least one customizable parameter comprising a dose time for at least one medication for which the prescription corresponding to the medication does not specifically indicate the prescribed dose time for the medication;
   causing the processor to associate the received at least one customizable parameter and the automatically selected dose times with the customer record;
   calculating in the processor a program start date associated with the alignment of the refill dates for each of the prescriptions; and
   creating a compliance packaging order including at least the selected prescriptions, the at least one customizable parameter, and the program start date;
   storing the created compliance packaging order in a memory coupled to the processor;
   sorting into the medication compliance package the medications associated with each of the selected prescriptions according to the stored compliance packaging order; and
   providing to the customer, on or before the program start date, a medication compliance package containing at least two medications having aligned refill dates.

2. The method of claim 1, further comprising:
   receiving a shipping address; and
   receiving payment information.

3. The method of claim 2, wherein receiving a shipping address comprises receiving a selection of a saved shipping address, receiving a selection of a current shipping address, or receiving a new shipping address.

4. The method of claim 2, wherein receiving payment information comprises receiving a selection of payment information previously associated with the customer record or receiving new payment information.

5. The method of claim 1, wherein receiving a selection of a plurality of prescriptions associated with the customer record comprises:
   providing the option to transfer a prescription previously filled at a different pharmacy; and
   receiving information related to the prescription previously filled at the different pharmacy.

6. The method of claim 1, wherein receiving a selection of a plurality of prescriptions associated with the customer record comprises:
   determining, by evaluating one or more eligibility criteria, for each prescription associated with the customer record, whether the prescription is eligible for the medication compliance packaging program; and
   providing a list of eligible prescriptions from which to select the plurality of prescriptions.

7. The method of claim 1, wherein receiving a selection of one or more dose times further comprises receiving a selection of each of the one or more dose times from at least four dose time options.

8. The method of claim 7, wherein each of the at least four dose time options is assigned a descriptive label, and further wherein each of the descriptive labels may be changed via the a control in the user interface, causing the medication compliance package to reflect the change.

9. The method of claim 1, further comprising determining, for each selected prescription, whether to set up a partial order.

10. The method of claim 9, wherein determining whether to set up a partial order comprises determining when the customer will exhaust a current supply of the medication.

11. The method of claim 10, further comprising calculating, based on the last time the prescription was filled, the date on which the customer will exhaust the current supply of the medication.

12. The method of claim 10, further comprising calculating, based on either an indication from the customer of how much of the current supply of the medication remains or a calculated estimate of how much of the current supply of the medication remains, the date on which the customer will exhaust the current supply of the medication.

13. The method of claim 12, further comprising adjusting the program start date in response to the indication from the customer of how much of the current supply of the medication remains.

14. The method of claim 10, further comprising:
   setting up one or more partial orders; and
   calculating a delivery date for each partial order.

15. The method of claim 14, further comprising:
   determining, for each partial order, whether the customer will exhaust the current supply of the medication before the delivery date for the partial order;
   receiving, for each partial order for which the customer will exhaust the current supply of the medication before the delivery date for the partial order, an indication either that the customer prefers to pick up the partial order at a store or that the customer prefers the partial order to be provided by a shipping service or a postal service.

16. The method of claim 15, wherein for each partial order for which an indication was received that the customer prefers to pick up the partial order at a store, the method further comprises:
   providing an opportunity to change the pickup time for the partial order;
   providing an opportunity to change the pickup date for the partial order; and
   providing an opportunity to change the location at which the partial order will be picked up.

17. The method of claim 1, wherein the program start date is calculated based on at least a first delivery method by which the compliance package is provided to the customer and further comprising:
- calculating, based on either an indication from the customer of how much of a current supply of the medication remains or a calculated estimate of how much of the current supply of the medication remains, the date on which the customer will exhaust the current supply of the medication;
- determining whether the customer will exhaust the current supply of the medication before the program start date;
- evaluating, if the customer will exhaust the current supply of the medication before the program start date, an alternate delivery method by which the compliance package could be provided to the customer, and
- evaluating a recalculated program start date based on at least the alternate delivery method by which the compliance package could be provided to the customer.

18. A system for enrolling a customer in a medication compliance packaging program, the system comprising:
- one or more computing devices;
- digital storage means associated with at least one of the one or more computing devices;
- a digital network; and
- machine-readable instructions stored on one or more memory devices and operable, when executed by the one or more computing devices, to cause the system to:
  - retrieve from a database a customer record;
  - display a user-interface screen;
  - receive, via the user interface screen, a selection of a plurality of prescriptions associated with the customer record, each prescription for a medication;
  - determine automatically one or more dose times for each medication for which the corresponding prescription specifically indicates a prescribed dose time for the medication;
  - receive, via the user interface, a selection customizing one or more dose times for each selected prescription for which the prescription corresponding to the medication does not specifically indicate the prescribed dose time for the medication;
  - associate the received selection customizing the one or more dose times with the customer record;
  - calculate refill dates associated with two or more selected prescriptions;
  - calculate with the one or more computing devices a program start date associated with the alignment of the refill dates for each of the prescriptions; and
  - create a compliance packaging order including at least the selected prescriptions, the one or more dose times, and the program start date; and
  - store the created compliance packaging order in a memory device.

19. The system of claim 18, wherein the machine-readable instructions are further operable to cause the system to generate a label for use in packaging the medications associated with the selected prescriptions or to print information associated with the selected prescriptions.

20. The system of claim 18, wherein the machine-readable instructions are further operable to cause the system to:
- provide the option to transfer a prescription previously filled at a different pharmacy; and
- receive information related to the prescription previously filled at the different pharmacy.

21. The system of claim 18, wherein the machine-readable instructions are further operable to cause the system to:
- determine, for each selected prescription, whether to set up a partial order;
- wherein determining whether to set up a partial order comprises determining when the customer will exhaust a current supply of the medication.

22. A method for enrolling a customer in a medication compliance packaging program, the method comprising:
- retrieving from a database a customer record indicating a plurality of prescriptions associated with the customer record, each prescription for a medication;
- receiving, via a user interface operating on a workstation, a selection of a set of prescriptions associated with the customer record;
- receiving, via the user interface, for each prescription of the set of selected prescriptions, one or more dose times;
- calculating in a processor associated with the workstation a program start date associated with the alignment of the refill dates for each of the prescriptions;
- creating a compliance packaging order including at least the selected prescriptions, the one or more dose times, and the program start date;
- storing the created compliance packaging order in a memory coupled to the processor; and
- providing to the customer, according to the stored compliance packaging order, on or before the program start date, a medication compliance package containing at least two medications having aligned refill dates and sorted into the compliance package according to the one or more dose times,
- wherein receiving one or more dose times comprises:
  - automatically setting, via the processor, the one or more dose times for each medication for which the corresponding prescription specifically indicates at least one prescribed dose time; and
  - receiving a selection of the one or more dose times for each medication for which the corresponding prescription does not specifically indicate at least one prescribed dose time.

23. The method of claim 22, wherein receiving one or more dose times further comprises receiving a selection for each of the one or more dose times from at least four dose time options.

24. The method of claim 22, wherein each of the at least four dose time options is assigned a descriptive label, and further wherein each of the descriptive labels may be changed via the a control in the user interface, causing the medication compliance package to reflect the change.

25. A method for enrolling a customer in a medication compliance packaging program, the method comprising:
- causing a processor to retrieve from a database a customer record indicating a plurality of prescriptions associated with the customer record, each prescription for a medication;
- receiving, via a user interface operating on a workstation, a selection of a set of prescriptions associated with the customer record;
- receiving, via the user interface, at least one customizable parameter of the medication compliance package, the at least one customizable parameter including a selection of one or both of an icon and text associated with each of one or more dose times;
- causing the processor to associate the received at least one customizable parameter with the customer record;
- calculating in the processor a program start date associated with the alignment of refill dates for each of the prescriptions; and creating a compliance packaging order including at least the selected prescriptions, the at least one customizable parameter, and the program start date;

storing the created compliance packaging order in a memory;

creating a medication compliance package according to at least the selection of one or both of an icon and text associated with each of the one or more dose times;

sorting into the medication compliance package the medications associated with each of the selected prescriptions according to the stored compliance packaging order, such that each medication is associated with the selected one or both of the icon and text for each of the one or more dose times; and providing to the customer, on or before the program start date, the medication compliance package containing at least two medications having aligned refill dates.

* * * * *